United States Patent
Medvedev et al.

(10) Patent No.: US 7,221,956 B2
(45) Date of Patent: *May 22, 2007

(54) POWER CONTROL FOR PARTIAL CHANNEL-STATE INFORMATION (CSI) MULTIPLE-INPUT, MULTIPLE-OUTPUT (MIMO) SYSTEMS

(75) Inventors: Irina Medvedev, Somerville, MA (US); Jay R. Walton, Westford, MA (US); John W. Ketchum, Harvard, MA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/049,319

(22) Filed: Feb. 1, 2005

(65) Prior Publication Data

US 2005/0130694 A1 Jun. 16, 2005

Related U.S. Application Data

(63) Continuation of application No. 10/079,970, filed on Feb. 19, 2002, now Pat. No. 7,076,263.

(51) Int. Cl.
*H04B 7/00* (2006.01)
(52) U.S. Cl. .................. 455/522; 455/13.4; 455/101; 455/132
(58) Field of Classification Search ............. 455/522, 455/69, 101, 132, 13.4, 127, 561, 506, 424, 455/67.13, 453; 370/333, 323
See application file for complete search history.

(56) References Cited

U.S. PATENT DOCUMENTS

| | | | |
|---|---|---|---|
| 6,084,915 A * | 7/2000 | Williams | 375/242 |
| 6,308,080 B1 * | 10/2001 | Burt et al. | 455/522 |
| 2002/0018453 A1 * | 2/2002 | Yu et al. | 370/333 |
| 2002/0057659 A1 * | 5/2002 | Ozluturk et al. | 370/335 |
| 2003/0139194 A1 * | 7/2003 | Onggosanusi et al. | 455/506 |
| 2003/0157954 A1 * | 8/2003 | Medvedev et al. | 455/522 |

* cited by examiner

*Primary Examiner*—Matthew D. Anderson
*Assistant Examiner*—Tan Trinh
(74) *Attorney, Agent, or Firm*—Thomas Rouse; Charles D. Brown; Howard H. Seo

(57) ABSTRACT

Techniques for controlling the transmit power for a number of data streams in a wireless multi-channel (e.g., MIMO) communication system. In one method, a number of received symbol streams are initially processed in accordance with a particular (e.g., CCMI, CCMI-SC, MMSE, or MMSE-SC) receiver processing technique to provide a number of detected data streams. The post-detection SNRs of the detected data streams are estimated, and each SNR that exceeds a setpoint is identified. This setpoint may correspond to (1) the SNR needed to achieve the maximum allowed spectral efficiency or (2) the target SNR needed to achieve a specified spectral efficiency. A new (or adjusted) transmit power for each detected data stream associated with a post-detection SNR that exceeds the setpoint is determined and used for the data stream. Different power control schemes are provided for different classes of receiver processing techniques with different characteristics.

14 Claims, 10 Drawing Sheets

POWER CONTROL FOR PARTIAL CHANNEL-STATE INFORMATION (CSI) MULTIPLE-INPUT, MULTIPLE-OUTPUT (MIMO) SYSTEMS

CLAIM OF PRIORITY UNDER 35 U.S.C. §120

The present Application for Patent is a Continuation and claims priority to patent application Ser. No. 10/079,970 entitled "Power Control for Partial Channel-State Information (CSI), Multiple-Input, Multiple-Output (MIMO) Systems" filed Feb. 19, 2002 now U.S. Pat. No. 7,076,263, and assigned to the assignee hereof and hereby expressly incorporated by reference herein.

BACKGROUND

1. Field

The present invention relates generally to data communication, and more specifically to techniques for controlling transmit power in multi-channel communication systems (e.g., multiple-input, multiple-output (MIMO) systems) that utilize partial channel-state information (CSI).

2. Background

In a wireless communication system, an RF modulated signal from a transmitter may reach a receiver via a number of propagation paths. The characteristics of the propagation paths typically vary over time due to a number of factors such as fading and multipath. To provide diversity against deleterious path effects and improve performance, multiple transmit and receive antennas may be used. If the propagation paths between the transmit and receive antennas are linearly independent (i.e., a transmission on one path is not formed as a linear combination of the transmissions on other paths), which is generally true to at least an extent, then the likelihood of correctly receiving a data transmission increases as the number of antennas increases. Generally, diversity increases and performance improves as the number of transmit and receive antennas increases.

A multiple-input, multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel (or a transmission channel) of the MIMO channel and corresponds to a dimension. The MIMO system can provide improved performance (e.g., increased transmission capacity) if the additional dimensionalities created by the multiple transmit and receive antennas are utilized. For example, an independent data stream may be transmitted on each of the $N_S$ spatial subchannels to increase system throughput.

Multiple data streams may be transmitted on the spatial subchannels using channel-state information (CSI), which is descriptive of the characteristics of the MIMO channel. CSI may be categorized as either "full CSI" or "partial CSI". Full CSI includes sufficient characterization (e.g., amplitude and phase) of the propagation path between each transmit-receive antenna pair in a ($N_R \times N_T$) MIMO matrix. Full CSI may not be available or practical for many MIMO systems. Partial CSI may comprise, for example, the signal-to-noise-and-interference ratios (SNRs) of the spatial subchannels, which may be estimated by detecting the data streams and/or pilots transmitted on these subchannels. Each data stream may then be coded and modulated in accordance with a particular coding and modulation scheme selected based on the subchannel's SNR.

The spatial subchannels of a MIMO system may experience different channel conditions (e.g., different fading and multipath effects) and may achieve different SNRs for a given amount of transmit power. Consequently, the data rates that may be supported by the spatial subchannels may be different from subchannel to subchannel. Moreover, the channel conditions typically vary with time. As a result, the data rates supported by the spatial subchannels also vary with time.

A key challenge in a MIMO system is the determination of the transmit powers to use for the data transmissions on the spatial subchannels based on the channel conditions. The goal of this transmit power control should be to maximize spectral efficiency while meeting other system objectives, such as achieving a particular target frame error rate (FER) for each data stream, minimizing interference, and so on.

In a practical communication system, there may be an upper limit on the data rate that may be used for any given data stream. For example, a set of discrete data rates may be supported by the system, and the maximum data rate from among these discrete data rates may be considered as the maximum spectral efficiency for any given data stream. In such a system, utilizing more transmit power than necessary for each data stream to achieve the target FER at the maximum data rate would result in an ineffective use of the additional transmit power. Even though the excess transmit power may result in a lower FER, this improvement in FER may not be considered substantial since the target FER has already been achieved. The excess transmit power for a given data stream may result in additional interference to other data streams, which may then degrade the performance of these data streams.

There is therefore a need in the art for techniques to control the transmit power of the data streams in a MIMO system utilizing partial CSI.

SUMMARY

Techniques are provided herein to control the transmit power for data transmission in a MIMO system such that the desired spectral efficiency is obtained while minimizing the total required transmit power. The post-detection SNRs of a number of data streams may be initially estimated. The transmit power for each data stream is then determined by taking into account the specific receiver processing technique used to detect the data streams at the receiver. The new transmit powers attempt to maintain the post-detection SNRs of the data streams either (1) at the SNR, $\gamma_{set}$, needed to achieve the maximum allowed spectral efficiency, for any SNR that exceeds $\gamma_{set}$, or (2) at or near the target SNR needed for a specified spectral efficiency.

In a specific embodiment, a method is provided for controlling the transmit power for a number of data streams in a wireless multi-channel (e.g., MIMO) communication system. Initially, a number of received symbol streams are processed in accordance with a particular receiver processing technique (e.g., a CCMI, CCMI-SC, MMSE, MMSE-SC, or some other technique, as described below) to provide a number of detected data streams. The post-detection SNRs of the detected data streams are estimated, and each SNR that exceeds a setpoint is identified. This setpoint may correspond to the SNR needed to achieve the maximum allowed spectral efficiency (e.g., the maximum data rate supported by the system) or the target SNR needed to achieve a specified spectral efficiency (e.g., a specific data rate). A new (or adjusted) transmit power for each detected data stream associated with a post-detection SNR that exceeds the setpoint is determined and used for the data stream.

The post-detection SNRs of the data streams are dependent on the specific receiver processing technique used at the receiver to detect the data streams. Moreover, the relationships between transmit powers and post-detection SNRs for the detected data streams may or may not be decorrelated. Different power control schemes are provided herein for different classes of receiver processing techniques with different characteristics. In a first class (which includes the CCMI and CCMI-SC techniques), the detected data streams are decoupled by the receiver processing, and changing the transmit power of one data stream does not affect the post-detection SNRs of the other data streams. The transmit power for each detected data stream may then be determined without regards to the transmit powers for the other data streams. In a second class (which includes the MMSE and MMSE-SC techniques), the post-detection SNR of a given data stream may be coupled to the transmit powers of the other data streams, and a change in the transmit power for one data stream may affect the post-detection SNRs of the other data streams. The transmit powers for the data streams may then be determined in a manner to take into account this inter-dependency, and the power adjustment may be iterated as many times as necessary to achieve the desired results.

Various aspects and embodiments of the invention are described in further detail below. The invention further provides methods, processors, receiver units, transmitter units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The techniques described herein for controlling transmit power for data transmissions may be used for various multi-channel communication systems. Such multi-channel communication systems include multiple-input, multiple-output (MIMO) communication systems, orthogonal frequency division multiplexing (OFDM) communication systems, MIMO systems that utilize OFDM (i.e., MIMO-OFDM systems), and others. The multi-channel communication systems may also implement code division multiple access (CDMA), time division multiple access (TDMA), frequency division multiple access (FDMA), or some other multiple access techniques. Multiple-access communication systems can support concurrent communication with a number of terminals (i.e., users). For clarity, various aspects and embodiments of the invention are described specifically for a MIMO system such as a multiple-antenna wireless communication system.

Figure 1:
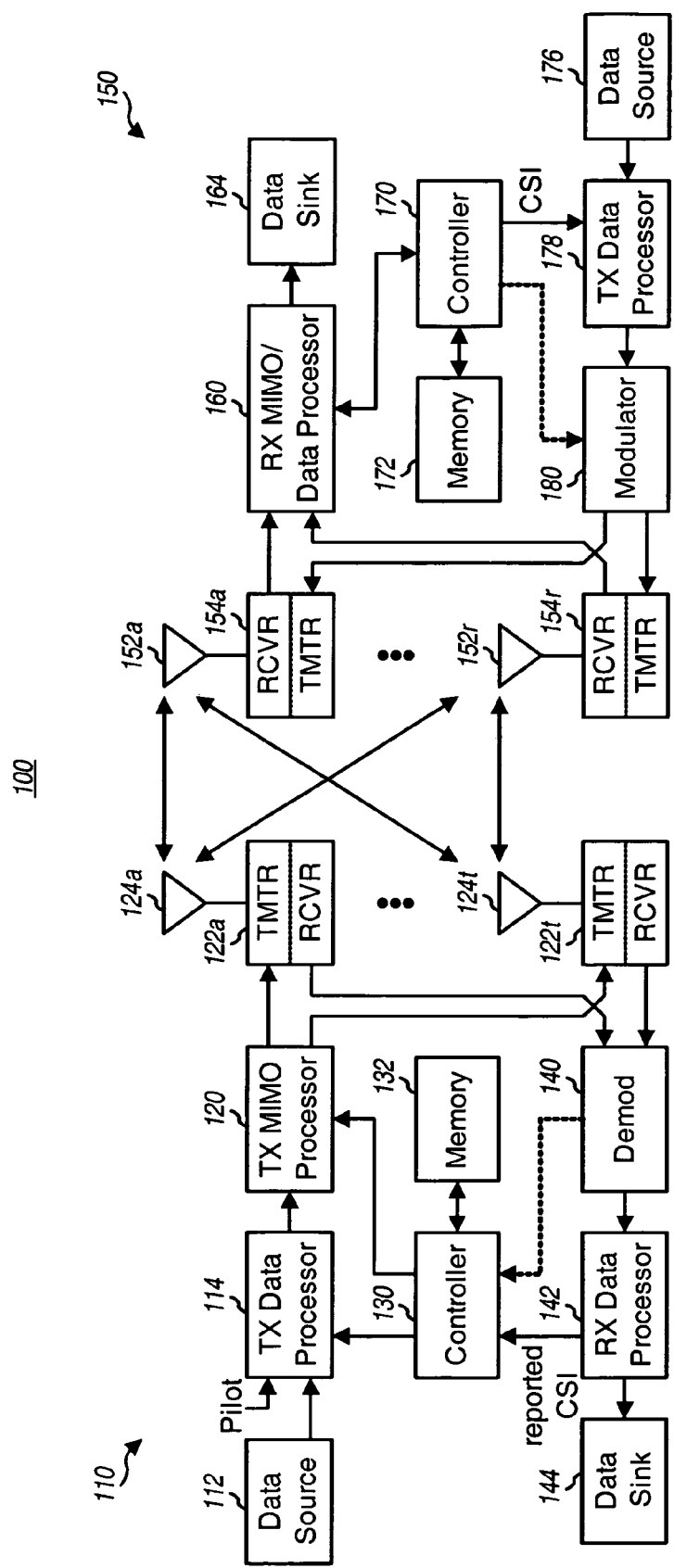
FIG. 1 is a block diagram of an embodiment of a transmitter system and a receiver system in a MIMO system.

FIG. 1 is a block diagram of an embodiment of a transmitter system 110 and a receiver system 150 in a MIMO system 100.

At transmitter system 110, traffic data for a number of data streams is provided from a data source 112 to a transmit (TX) data processor 114. Each data stream may be transmitted over a single transmission channel or a group of transmission channels. TX data processor 114 formats, codes, and interleaves the traffic data for each data stream based on a particular coding scheme selected for that data stream to provide coded data. The coded traffic data for all data streams may be multiplexed with pilot data (e.g., using time division multiplex (TDM) or code division multiplex (CDM)) in all or a subset of the transmission channels to be used for data transmission. The pilot data is typically a known data pattern that is processed in a known manner, if at all. The multiplexed pilot and coded traffic data for each data stream is then modulated (i.e., symbol mapped) based on a particular modulation scheme (e.g., BPSK, QSPK, M-PSK, or M-QAM) selected for that data stream to provide modulation symbols. The data rate, coding, interleaving, and modulation for each data stream may be determined by controls provided by a controller 130.

The modulation symbols for all data streams are then provided to a TX MIMO processor 120. In an embodiment, TX MIMO processor 120 scales the modulation symbols for each data stream by a respective weight determined based on the amount of transmit power to be used for that data stream. TX MIMO processor 120 then demultiplexes the scaled modulation symbols into (up to) $N_T$ transmit symbol streams, one transmit symbol stream for each of the (up to) $N_T$ transmit antennas to be used for data transmission. The up to $N_T$ transmit symbol streams are then provided to transmitters (TMTR) 122a through 122t.

Each transmitter 122 for a selected transmit antenna receives and processes a respective transmit symbol stream. For an OFDM system, each transmitter transforms the scaled modulation symbols (e.g., using the inverse Fourier transform) to form OFDM symbols, and may further append a cyclic prefix to each OFDM symbol to form a corresponding transmission symbol. Each transmitter converts the symbol stream into one or more analog signals and further conditions (e.g., amplifies, filters, and quadrature modulates) the analog signals to generate a modulated signal suitable for transmission over the MIMO channel. Up to $N_T$ modulated signals from transmitters 122a through 122t are then transmitted from up to $N_T$ antennas 124a through 124t, respectively.

At receiver system 150, the transmitted modulated signals are received by $N_R$ antennas 152a through 152r, and the received signal from each antenna 152 is provided to a respective receiver (RCVR) 154. Each receiver 154 conditions (e.g., filters, amplifies, and downconverts) the received signal and digitizes the conditioned signal to provide a respective stream of samples. Each sample stream may further be processed (e.g., demodulated with a recovered pilot) to obtain a corresponding stream of received symbols.

An RX MIMO/data processor 160 then receives and processes the $N_R$ received symbol streams to provide $N_S$ "detected" data streams. RX MIMO/data processor 160 may perform spatial or space-time processing on the $N_R$ received symbol streams using any of a number of spatial and space-time receiver processing techniques, some of which are described in further detail below. Each detected data stream includes symbols that are estimates of the modulation symbols transmitted for that data stream. RX MIMO/data processor 160 then demodulates, deinterleaves, and decodes each detected data stream to recover the traffic data for the data stream. The processing by RX MIMO/data processor 160 is complementary to that performed by TX MIMO processor 120 and TX data processor 114 at transmitter system 110.

RX MIMO processor 160 may further derive an estimate of the signal-to-noise-and-interference ratios (SNRs) of the data streams, and possibly other channel characteristics, and provide these quantities to a controller 170. RX MIMO/data processor 160 may also provide the status of each received frame or packet, one or more other performance metrics indicative of the decoded results, and possibly other information. Controller 170 collects channel state information (CSI), which may comprise all or some of the information received from RX MIMO/data processor 160. The CSI is then processed by a TX data processor 178, modulated by a modulator 180, conditioned by transmitters 154a through 154r, and transmitted back to transmitter system 110.

At transmitter system 110, the modulated signals from receiver system 150 are received by antennas 124, conditioned by receivers 122, demodulated by a demodulator 140, and processed by a RX data processor 142 to recover the CSI reported by the receiver system. The CSI is then provided to controller 130 and used to generate various controls for TX data processor 114 and TX MIMO processor 120.

Controllers 130 and 170 direct the operation at the transmitter and receiver systems, respectively. Memories 132 and 172 provide storage for program codes and data used by controllers 130 and 170, respectively.

For a MIMO system that employs multiple ($N_T$) transmit antennas and multiple ($N_R$) receive antennas for data transmission, the MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel (or a transmission channel) of the MIMO channel. The number of spatial subchannels is determined by the number of eigenmodes for the MIMO channel, which in turn is dependent on a channel response matrix, $\underline{H}$, that describes the response between the $N_T$ transmit and $N_R$ receive antennas. The elements of the channel response matrix, $\underline{H}$, are composed of independent Gaussian random variables, $\{h_{j,i}\}$, each of which is descriptive of the coupling (i.e., the complex gain) between the i-th transmit antenna and the j-th receive antenna In general, each data stream may be transmitted from one or multiple transmit antennas. However, for simplicity, much of the description below assumes that one data stream is transmitted from each transmit antenna. Each spatial subchannel may support one data stream. For simplicity, the number of spatial subchannels is assumed to be equal to the number of transmit antennas and receive antennas (i.e., $N_S = N_T = N_R$).

The model for the MIMO system may be expressed as:

$$\underline{y} = \underline{HAx} + \underline{n}, \quad \text{Eq (1)}$$

where $\underline{y}$ is the received vector, i.e., $\underline{y} = [y_1 \ y_2 \ \ldots \ y_{N_R}]^T$, where $\{y_j\}$ is the entry received on the j-th received antenna and $j \in \{1, \ldots, N_R\}$;

$\underline{x}$ is the transmitted vector, i.e., $\underline{x} = [x_1 \ x_2 \ \ldots \ x_{N_T}]^T$, where $\{x_i\}$ is the entry transmitted from the i-th transmit antenna and $i \in \{1, \ldots, N_T\}$;

$\underline{H}$ is the channel response matrix for the MIMO channel;

$\underline{A}$ is a diagonal matrix of the amplitudes of the data streams, $\{A_i\}$;

$\underline{n}$ is the additive white Gaussian noise (AWGN) with a mean vector of $\underline{0}$ and a covariance matrix of $\underline{\Lambda}_n = \sigma^2 \underline{I}$, where $\underline{0}$ is a vector of zeros, $\underline{I}$ is the identity matrix with ones along the diagonal and zeros everywhere else, and $\sigma^2$ is the variance of the noise; and $[.]^T$ denotes the transpose of $[.]$.

The diagonal matrix, $\underline{A}$, may be expressed as:

$$\underline{A} = \begin{bmatrix} A_1 & 0 & \cdots & 0 \\ 0 & A_2 & \cdots & 0 \\ \vdots & \vdots & \ddots & \vdots \\ 0 & 0 & \cdots & A_{N_T} \end{bmatrix}, \quad \text{Eq (2)}$$

where $A_i$ represents the amplitude of the data stream $x_i$ transmitted from the i-th transmit antenna. The amplitude $A_i$ and the transmit power $P_i$ of data stream $x_i$ are related by $P_i \propto A_i^2$.

The model for the MIMO system may be expressed in a more compact form, as follows:

$$\underline{y} = \underline{Cx} + \underline{n}, \quad \text{Eq (3)}$$

where the composite channel matrix, $\underline{C}$, is defined as $\underline{C} = \underline{HA}$.

For simplicity, the MIMO channel is assumed to be a flat-fading, narrowband channel. In this case, the elements of the channel response matrix, $\underline{H}$, are scalars, and the coupling, $h_{j,i}$, between each transmit-receive antenna pair can be represented by a single scalar value. However, the power control techniques described herein may also be used for a frequency selective channel having different channel gains at different frequencies. In such a frequency selective channel, the operating bandwidth may be divided into a number of (equal or unequal width) frequency bands such that each band may be considered as a flat-fading channel. The response of the individual bands may then be considered in performing power control.

Due to scattering in the propagation environment, the $N_S$ data streams transmitted from the $N_T$ transmit antennas interfere with each other at the receiver. In particular, a given data stream transmitted from one transmit antenna may be received by all $N_R$ receive antennas at different amplitudes and phases. Each received signal may then include a component from each of the $N_T$ transmitted data streams. The $N_R$ received signals would collectively include all $N_T$ transmitted data streams; however, these data streams are dispersed among the received signals.

Various processing techniques may be used at the transmitter and receiver to ameliorate the effects of interference. These processing techniques depend on the available CSI and the characteristics of the MIMO channel The processing at the transmitter and receiver is dependent on the available CSI, which may be categorized as either "full CSI" or "partial CSI". Full CSI includes sufficient characterization (e.g., amplitude and phase) across the entire system bandwidth for the propagation path between each transmit-receive antenna pair in a ($N_R \times N_T$) MIMO matrix. Full CSI may not be available or practical for many systems. Partial CSI may comprise, for example, the SNRs of the transmission channels.

For a MIMO system utilizing partial CSI, at the transmitter each data stream may be coded and modulated in accordance with a particular coding and modulation scheme selected based on the achievable SNR. In the partial-CSI system, one data stream may be transmitted on each antenna and the transmit power for each data stream may also be adjusted based on the SNR and the selected coding and modulation scheme.

At the receiver, various receiver processing techniques may be used to process the received signals to recover the transmitted data streams. These receiver processing techniques may be grouped into two primary categories:

spatial and space-time receiver processing techniques (which are also referred to as equalization techniques), and "successive nulling/equalization and interference cancellation" receiver processing technique (which is also referred to as "successive interference cancellation" or "successive cancellation" receiver processing technique).

In general, the spatial and space-time receiver processing techniques attempt to separate out the transmitted data streams at the receiver. Each transmitted data stream may be "detected" by combining the various components of the transmitted data streams included in the $N_R$ received signals based on an estimate of the channel response and removing (or canceling) the interference due to the components of the other data streams. These receiver processing techniques attempt to either (1) decorrelate the received data streams such that there is no interference from the other data streams or (2) maximize the SNR of each data stream in the presence of noise and interference from the other data streams. Each detected data stream is then further processed (e.g., demodulated, deinterleaved, and decoded) to recover the traffic data for the data stream.

The successive cancellation receiver processing technique attempts to recover the transmitted data streams, one at a time using a spatial or space-time receiver processing technique, and to cancel the interference due to each recovered data stream such that later recovered data streams experience less interference and may be able to achieve higher SNR. The successive cancellation receiver processing technique may be used if the interference due to each recovered data stream can be accurately estimated and canceled, which requires error free recovery of the data stream. The successive cancellation receiver processing technique generally outperforms the spatial/space-time receiver processing techniques.

The specific receiver processing technique to be used is typically dependent on the characteristics of the MIMO channel, which may be characterized as either non-dispersive or dispersive. A non-dispersive MIMO channel experiences flat fading (i.e., approximately equal amount of attenuation across the system bandwidth), and a dispersive MIMO channel experiences frequency-selective fading (e.g., different amounts of attenuation across the system bandwidth).

For a non-dispersive MIMO channel, spatial receiver processing techniques may be used to process the received signals to provide the detected data streams. These spatial receiver processing techniques include a channel correlation matrix inversion (CCMI) technique and a minimum mean square error (MMSE) technique. Other spatial receiver processing techniques may also be used and are within the scope of the invention.

For a dispersive MIMO channel, time dispersion in the channel introduces inter-symbol interference (ISI). To improve performance, a receiver attempting to recover a particular transmitted data stream would need to ameliorate both the interference (or "crosstalk") from the other transmitted data streams as well as the ISI from all data streams. To combat both crosstalk and ISI, space-time receiver processing techniques may be used to process the received signals to provide the detected data streams. These space-time receiver processing techniques include a MMSE linear equalizer (MMSE-LE), a decision feedback equalizer (DFE), a maximum-likelihood sequence estimator (MLSE), and so on.

For clarity, the power control techniques are described specifically for the CCMI and MMSE techniques, each with and without successive cancellation. The power control techniques may similarly be applied to other receiver processing techniques, and this is within the scope of the invention.

Power Control

In a MIMO system with $N_T$ transmit and $N_R$ receive antennas, the number of resolvable data streams is $N_S \leq \min\{N_T, N_R\}$ when $\underline{H}$ is a full-rank matrix. The set of data streams may be represented as $\{x_1, x_2, \ldots, x_{N_S}\}$, or $\{x_i\}$ for $i \in D$ where $D=\{1, \ldots, N_S\}$. Each data stream is associated with a particular "post-detection" SNR, $\gamma_{post}$, after the spatial or space-time receiver processing at the receiver. The post-detection SNR of data stream $x_i$ may be expressed as:

$$\gamma_{post}(i) = \frac{P_i}{I_i}, \quad \text{for } \forall\, i \in D, \qquad \text{Eq (4)}$$

where $P_i$ represents the transmit power of data stream $x_i$ (i.e., $P_i = |x_i|^2$), and $I_i$ represents the noise and interference experienced by data stream $x_i$ (e.g., from the other data streams). The post-detection SNRs are dependent on the characteristics of the MIMO channel and may be different for different data streams. If successive cancellation receiver processing technique is used, then the post-detection SNRs may also differ depending on the particular order in which the data streams are detected at the receiver, as described below.

The post-detection SNR of each data stream contributes to the overall spectral efficiency of the MIMO system. The spectral efficiency of a given data stream may be defined based on a particular monotonically increasing function in post-detection SNR. One function that may be used for spectral efficiency is the capacity function. In this case, the spectral efficiency, $\rho_i$, of data stream $x_i$, for $i \in D$, may be expressed as:

$$\rho_i = \log_2(1+\gamma_{post}(i)), \quad \text{Eq (5)}$$

and is typically given in units of bits per second per Hertz (bps/Hz).

The total spectral efficiency, $\rho_{tot}$, of the MIMO system is equivalent to that of a system with $N_S$ parallel single-input, single-output (SISO), non-interfering channels, and may be expressed as:

$$\rho_{tot} = \sum_{i=1}^{N_S} \rho_i. \quad \text{Eq (6)}$$

Figure 2:
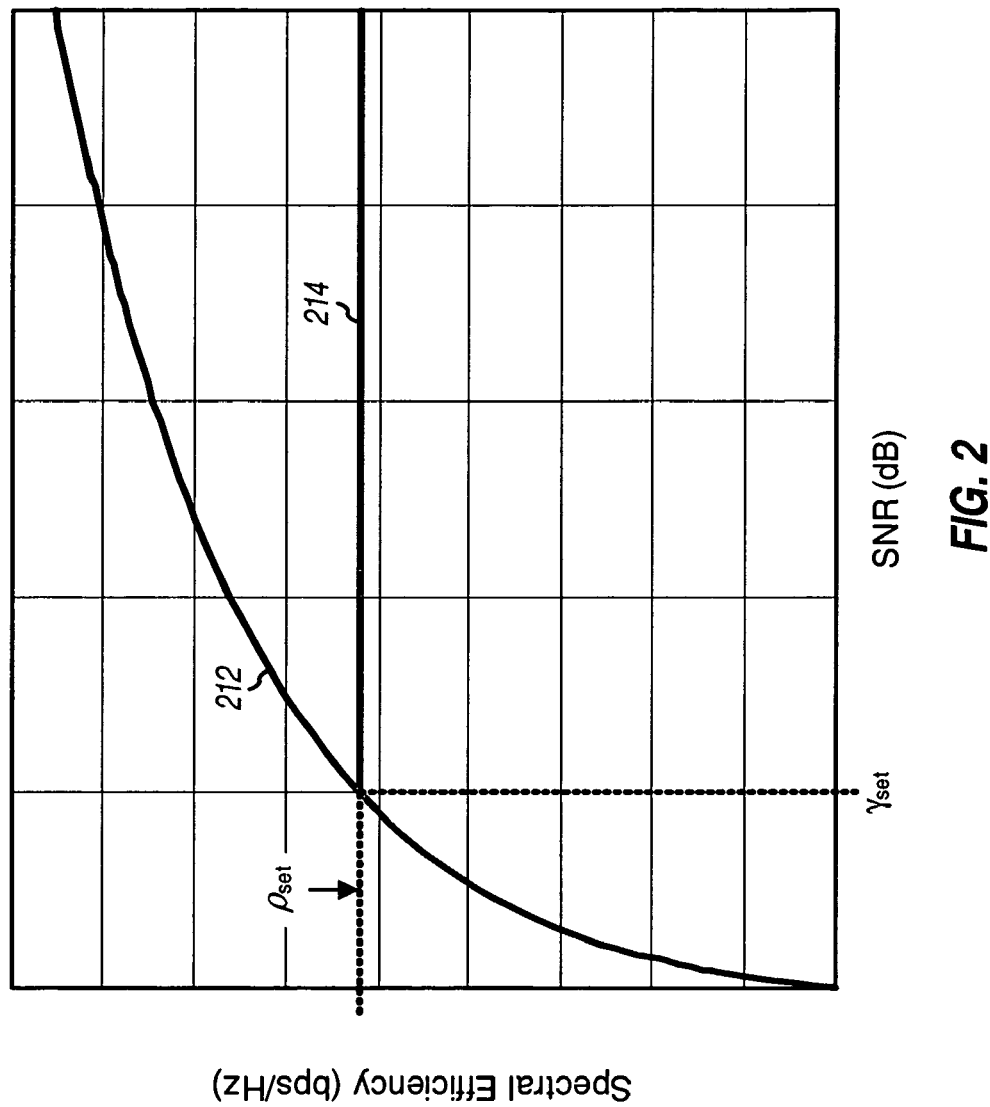
FIG. 2 shows two plots for spectral efficiency versus post-detection SNR.

FIG. 2 shows two plots for spectral efficiency versus post-detection SNR. Plot 212 shows spectral efficiency increasing logarithmically with SNR as computed based on equation (5), which assumes that an increase in SNR results in a corresponding increase in spectral efficiency. However, in a practical communication system, there may be an upper limit on the spectral efficiency, which may be dictated, for example, by the maximum data rate supported by the system for any given data stream. Plot 214 shows spectral efficiency increasing logarithmically at lower SNRs and saturating at $\rho_{set}$, which is the upper limit on spectral efficiency. Saturation occurs when an increase in SNR no longer produces an increase in spectral efficiency. The SNR at which spectral efficiency saturates may be denoted as $\gamma_{set}$ (i.e., $\gamma_{set} \leftrightarrow \rho_{set}$).

In typical systems, there is a power limit on each transmit antenna. In some systems, the total transmit power, $P_{tot}$, available for use for all $N_T$ transmit antennas may be initially allocated to the data streams in some manner, as long as the power limit per antenna is not exceeded. For example, if the power limit on each of the $N_T$ transmit antennas is $P_{tot}/N_T$ and one data stream is transmitted from each antenna, then the total transmit power may be uniformly distributed such that each of the $N_T$ transmit antennas is initially allocated $P_{tot}/N_T$, and therefore, each data stream is also allocated $P_{tot}/N_T$. This is true even if only some of these antennas are used for data transmission. In this case, if $N_S < N_T$, each transmit antenna may be allocated at most $P_{tot}/N_T$, and each data stream is also transmitted at $P_{tot}/N_T$ power. In this situation when the number of data streams is less than the number of transmit antennas, the total power used at the transmitter is less than $P_{tot}$ and equal to $N_S \cdot P_{tot}/N_T$.

Depending on the transmit powers, $P_i$, for $i \in D$, used for the data streams and the noise variance, $\sigma^2$, the post-detection SNRs of some data streams may be higher than $\gamma_{set}$. Although post-detection SNRs above $\gamma_{set}$ may lower the frame error rate (FER), this type of improvement in performance is typically not substantial since the system may already be operating at the target FER or at a low FER. In this case, the excess transmit power that results in the SNR being higher than $\gamma_{set}$ is not effectively utilized and also causes additional interference to other data streams. The transmit power used for each data stream with a post-detection SNR greater than $\gamma_{set}$ may thus be reduced so that the new post-detection SNR is at or near $\gamma_{set}$.

Similarly, in some systems, there may be a particular target SNR at the receiver for each data stream, which is also commonly referred to as the setpoint. The target SNR is the post-detection SNR needed to achieve the target FER for a particular data rate and may also be represented as $\gamma_{set}$. For a power-controlled MIMO system, if the transmit power currently used for a given data stream results in a post-detection SNR different than the setpoint, then the transmit power for this data stream may be adjusted either up or down such that the new post-detection SNR approaches the setpoint. The setpoint may also be adjusted (e.g., based on the detected frame errors or erasures) to achieve the target FER.

Techniques are provided herein to control the transmit powers for the data streams in a MIMO system such that various benefits may be achieved. The post-detection SNRs of the data streams may be initially estimated. The transmit power for each data stream is then determined by taking into account the specific receiver processing technique used to detect the data streams at the receiver. The new transmit powers attempt to maintain the post-detection SNRs of the detected data streams at or below the saturation post-detection SNR (for a system with an upper limit on spectral efficiency) or at or near the setpoint (for a system with a specified spectral efficiency).

As noted above, the post-detection SNRs of the data streams are dependent on the particular receiver processing technique used at the receiver to detect the data streams. Moreover, the relationships between transmit powers and post-detection SNRs for the detected data streams may be decorrelated or not decorrelated for different receiver processing techniques. Different power control schemes are provided herein for different classes of receiver processing techniques with different characteristics. In the first class, the detected data streams are decoupled by the receiver processing, and changing the transmit power of one data stream does not affect the post-detection SNRs of the other data streams. This first class includes the CCMI and CCMI with successive cancellation (i.e., CCMI-SC) receiver processing techniques. In the second class, the post-detection SNR of a given data stream may be coupled to one or more of the other data streams' transmit powers, and a change in transmit power for one data stream may affect the post-detection SNRs of the other data streams. This second class includes the MMSE and MMSE with successive cancellation (i.e., MMSE-SC) receiver processing techniques. Power control for the CCMI, CCMI-SC, MMSE, and MMSE-SC receiver processing techniques are described in further detail below.

Power Control for CCMI Receiver

The CCMI receiver processing technique (which is also known as a decorrelation or a zero-forcing technique) is an interference cancellation technique that does not require full CSI at the transmitter. With the CCMI technique, the transmitter can transmit an independent data stream from each transmit antenna. The receiver first performs a channel matched-filter operation on the received vector, $\underline{y}$, which is representative of the received symbol streams. The resulting vector, $\underline{\tilde{x}}$, may be expressed as:

$$\underline{\tilde{x}} = \underline{C}^H \underline{y} \quad \text{Eq (7)}$$
$$= \underline{C}^H \underline{C} \underline{x} + \underline{C}^H \underline{n},$$

where $[.]^H$ denotes the conjugate transpose of $[.]$.

A composite channel correlation matrix, $\underline{R}$, may be defined as:

$$\underline{R} = \underline{C}^H \underline{C}. \quad \text{Eq (8)}$$

Equation (7) can then be rewritten as:

$$\tilde{x} = \underline{R}x + \underline{C}^H \underline{n}.\qquad\text{Eq (9)}$$

Since $\underline{R}$ is a square matrix of dimension $N_T$, the interference it causes to the transmitted data streams, $\underline{x}$, can be cancelled by multiplying $\tilde{\underline{x}}$ by the inverse of $\underline{R}$, $\underline{R}^{-1}$, to obtain the following:

$$\begin{aligned}\hat{\underline{x}} &= \underline{R}^{-1}\tilde{\underline{x}} \\ &= \underline{R}^{-1}\underline{R}\underline{x} + \underline{R}^{-1}\underline{C}^H\underline{n} \\ &= \underline{x} + \tilde{\underline{n}}.\end{aligned}\qquad\text{Eq (10)}$$

The vector $\hat{\underline{x}}$ is representative of the detected data streams, which are estimates of the transmitted data streams. The covariance matrix of $\tilde{\underline{n}}$ may be expressed as:

$$\tilde{\underline{\Lambda}}_n = (\underline{R}^{-1}\underline{C}^H)\underline{\Lambda}_n(\underline{R}^{-1}\underline{C}^H)^H = \underline{R}^{-1}\sigma^2.\qquad\text{Eq (11)}$$

Due to the structure of $\underline{R}^{-1}$, the CCMI technique may amplify the noise.

For the CCMI technique, the post-detection SNR of data stream $x_i$ may be expressed as:

$$\gamma_{ccmi}(i) = \frac{P_i}{\breve{r}_{ii}\sigma^2}, \quad \text{for } \forall\, i \in D,\qquad\text{Eq (12)}$$

where $P_i$ is the transmit power for data stream $x_i$, $\sigma^2$ is the noise power at the receiver, and $\breve{r}_{ii}$ is the i-th diagonal element of $\underline{R}^{-1}$. It can be noted that there is no interference term in the denominator in equation (12). This results from the fact that the data streams are decorrelated by the CCMI processing and thus do not interfere with each other.

The CCMI receiver processing technique is described in further detail in U.S. patent application Ser. No. 09/993,087, entitled "Multiple-Access Multiple-Input Multiple-Output (MIMO) Communication System," filed Nov. 6, 2001; U.S. patent application Ser. No. 09/854,235, entitled "Method and Apparatus for Processing Data in a Multiple-Input Multiple-Output (MIMO) Communication System Utilizing Channel State Information," filed May 11, 2001; and U.S. patent application Ser. Nos. 09/826,481 and 09/956,449, both entitled "Method and Apparatus for Utilizing Channel State Information in a Wireless Communication System," respectively filed Mar. 23, 2001 and Sep. 18, 2001. These applications are all A key goal of power control is to use the least amount of transmit power to obtain the highest possible spectral efficiency. The CCMI receiver processing provides a set of post-detection SNRs for the detected data streams. As noted above, there may be an upper limit on the spectral efficiency of a given data stream. This spectral efficiency, $\rho_{set}$, corresponds to the SNR $\gamma_{set}$. If the post-detection SNR of any given data stream is greater than $\gamma_{set}$, then the transmit power for that data stream may be adjusted to reduce transmit power without impacting spectral efficiency.

Figure 3:
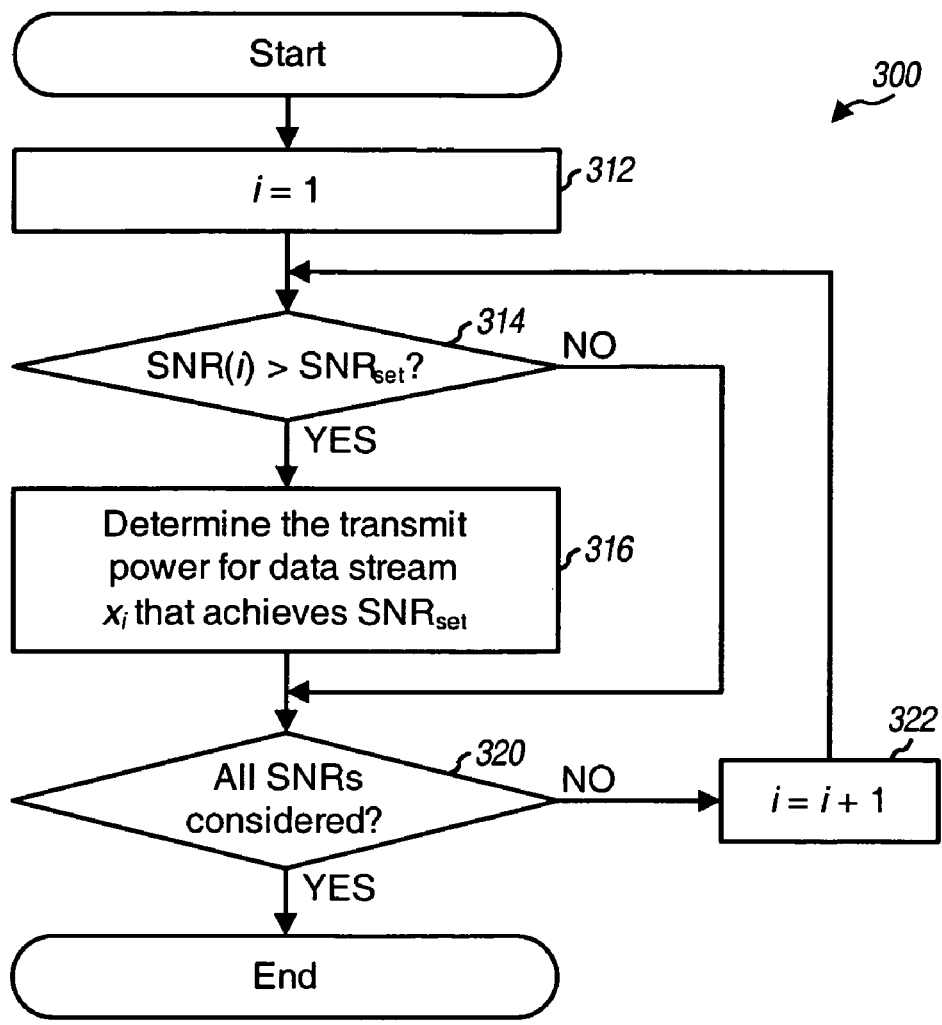
FIG. 3 is a flow diagram of a process for adjusting the transmit power to achieve a set of post-detection SNRs for a CCMI receiver.

FIG. 3 is a flow diagram of a process 300 for adjusting the transmit power to achieve a set of post-detection SNRs for a CCMI receiver. Process 300 determines the minimum total transmit power needed to achieve a set of post-detection SNRs that maximize spectral efficiency. Initially, the variable i used to denote the data stream number is initialized to one (i.e., i=1) (step 312). Each post-detection SNR in the set is then examined and the new transmit power, $\hat{P}_i$, to use for the corresponding data stream is determined starting at step 314.

For each data stream, a determination is first made whether or not the post-detection SNR, $\gamma_{post}(i)$, is greater than $\gamma_{set}$ (step 314). (In the figures, $\gamma_{post}(i)$ is denoted as SNR(i) and $\gamma_{set}$ is denoted as $SNR_{set}$.) If the answer is no, then the transmit power for this data stream is not adjusted (i.e., $\hat{P}_i = P_i$) and the process proceeds to step 320. Otherwise, if $\gamma_{post}(i) > \gamma_{set}$, then the new transmit power, $\hat{P}_i$, for data stream $x_i$ that achieves $\gamma_{post}(i) = \gamma_{set}$ is determined (step 316). The relationship between $\hat{P}_i$ and $\gamma_{set}$ may be expressed as:

$$\gamma_{set} = \frac{\hat{P}_i}{\breve{r}_{ii}\sigma^2}.\qquad\text{Eq (13)}$$

Using equation (13) together with equation (12) for the CCMI technique, the new transmit power to use for data stream $x_i$ may be expressed as:

$$\hat{P}_i = \frac{\gamma_{set}}{\gamma_{post}(i)} P_i,\qquad\text{Eq (14)}$$

where $\gamma_{post}(i) = \gamma_{ccmi}(i)$ for the CCMI technique. The simple relationship seen in equation (14) is a result of the linear relationship between the post-detection SNR and the transmit power, as shown in equation (12).

A determination is then made whether or not all post-detection SNRs in the set have been considered (step 320). If the answer is no, then the variable i is incremented (step 322), and the process returns to step 314 to evaluate another post-detection SNR in the set. Otherwise, the process terminates.

The process shown in FIG. 3 results in a set of transmit powers, $\{\hat{P}_i\}$, for $i \in D$, to be used for the data streams. This set includes transmit powers that have been adjusted to achieve $\gamma_{set}$.

If any initial post-detection SNRs are greater than $\gamma_{set}$, then the new transmit powers, $\hat{P}_i$, to bring these post-detection SNRs to $\gamma_{set}$ will be lower than the initial transmit powers, $P_i$. The total power saved may be determined as:

$$\Delta P_{total} = 10\log_{10}\left(\sum_{i=1}^{N_S} P_i\right) - 10\log_{10}\left(\sum_{i=1}^{N_S} \hat{P}_i\right),\qquad\text{Eq (15)}$$

where the new transmit power, $\hat{P}_i$, may or may not be equal to the initial transmit power, $P_i$, depending on whether or not the initial post-detection SNR is greater than $\gamma_{set}$.

Power Control for CCMI-SC Receiver

The CCMI technique may be used in conjunction with successive interference cancellation. For the CCMI-SC technique, the received symbol streams are processed using CCMI spatial receiver processing to recover one data stream at a time based on a particular detection order. As each data stream is recovered, the interference it causes to the other, not yet recovered data streams is estimated using the composite channel matrix, $\underline{C}$. The estimated interference is then subtracted or canceled from the received symbol streams, and the modified symbol streams are then processed to recover the next data stream. For this recursive technique, the composite channel matrix is successively shortened at each stage to exclude the data stream that has just been recovered, and the process is repeated until all data streams have been recovered.

Figure 4:
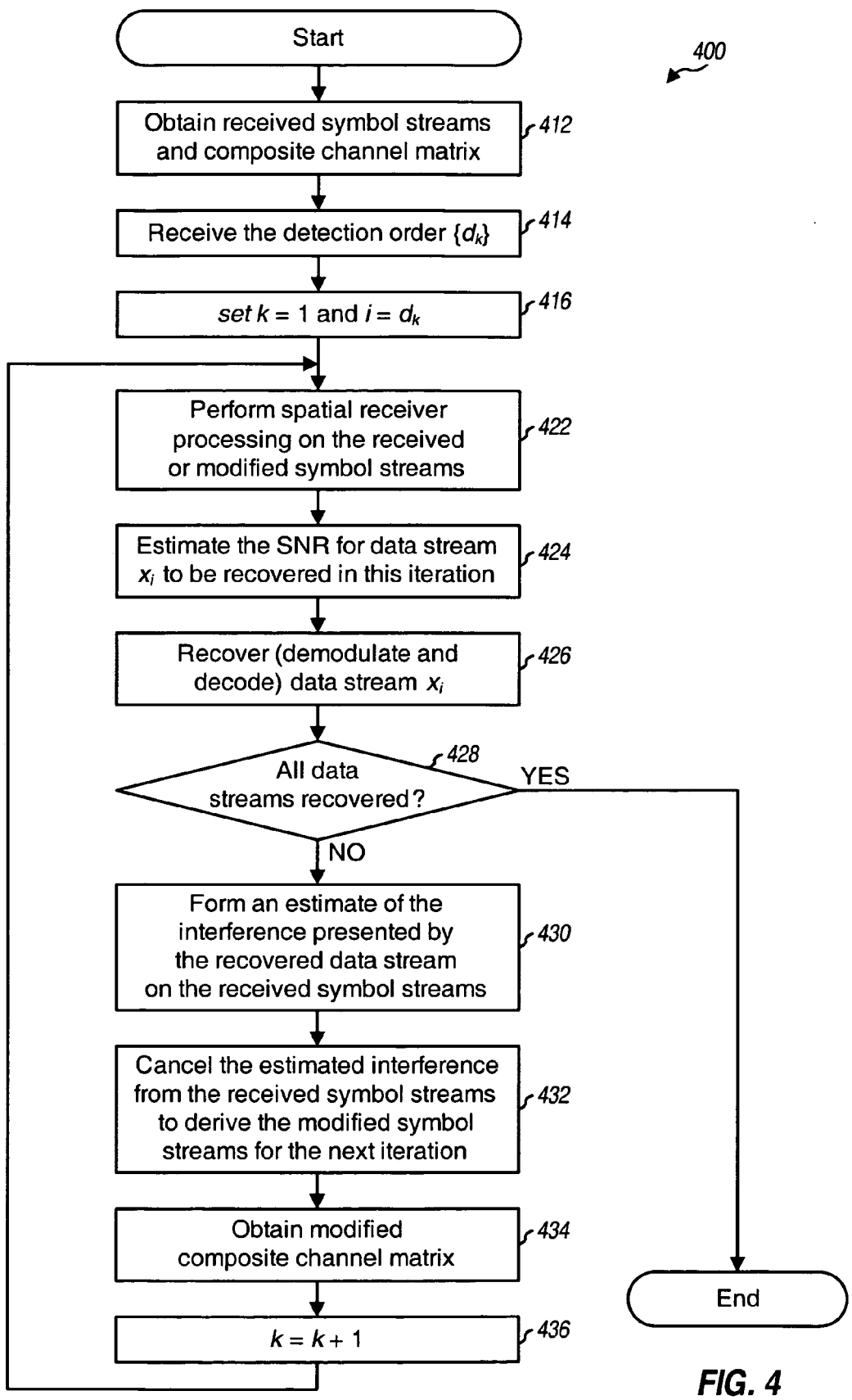
FIG. 4 is a flow diagram illustrating the CCMI-SC receiver processing technique.

FIG. 4 is a flow diagram illustrating a process 400 for the CCMI-SC receiver processing technique. Initially, the $N_R$ received signals are processed to obtain $N_R$ corresponding received symbol streams (which are denoted as the received vector, $\underline{y}$) (step 412). The composite channel matrix, $\underline{C}$, is also estimated, for example, based on the pilot included in the data transmission (also step 412). A specific order for detecting the data streams is received (step 414). This detection order may be represented as $D=\{d_1, d_2, \ldots d_{N_T}\}$, where $d_k$ is the identity of the data stream to be recovered in the k-th stage. The variable k used to denote the iteration (or stage) number is initialized to one (i.e., k=1) for the first iteration, and the variable i is set as $i=d_k$ (step 416).

For the first iteration to detect the first data stream in the detection order D, the CCMI spatial receiver processing is initially performed on the received symbol streams (step 422). This is achieved by performing the channel matched-filter operation on the received vector, $\underline{y}$, as shown in equation (7), and then pre-multiplying the resultant vector, $\underline{\tilde{x}}$, with the inverse composite channel correlation matrix, $\underline{R}^{-1}$, as shown in equation (10), to provide $N_S$ detected data streams. One particular detected data stream, $\hat{x}_i$, is then selected, as determined by the received detection order, and the post-detection SNR, $\gamma_{post}(i)$, for this data stream is estimated, (step 424). The detected data stream, $\hat{x}_i$, may further be processed (e.g., demodulated, deinterleaved, and decoded) to recover the transmitted traffic data for the data stream (step 426).

A determination is then made whether or not all data streams have been detected (step 428). If the answer is yes, then the receiver processing terminates. Otherwise, the interference due to the detected data stream $x_i$ on the remaining, not yet detected data streams is estimated (step 430). The interference may be estimated by first re-encoding the decoded data for the detected data stream, interleaving the re-encoded data, and symbol-mapping the interleaved data (using the same coding, interleaving, and modulation schemes used at the transmitter for this data stream) to obtain a "remodulated" symbol stream. The remodulated symbol stream is an estimate of the i-th symbol stream previously transmitted from one of the $N_T$ transmit antennas. The remodulated symbol stream is then convolved by the elements of a composite channel vector, $\underline{c}_i$ (which is the i-th column of the matrix $\underline{C}$ and corresponds to the detected data stream $\hat{x}_i$) to derive a vector $\underline{i}^k$ of $N_R$ interference components due to this data stream at the k-th stage.

The estimated interference due to the detected data stream, $\hat{x}_i$, is then subtracted from the received symbol streams to derive the modified symbol streams for the next iteration (i.e., $\underline{y}^{k+1}=\underline{y}^k-\underline{i}^k$, where $\underline{y}^1=\underline{y}$) (step 432). These modified symbol streams represent the received symbol streams that would have been obtained at the receiver if the detected data stream $x_i$ had not been transmitted (i.e., assuming that the interference cancellation was effectively performed).

A modified composite channel matrix, $\underline{C}_{k+1}$, is then obtained by removing the column $\underline{c}_i$ corresponding to the detected data stream $x_i$ (step 434). The matrix $\underline{C}_{k+1}$ is thus reduced to $N_R \times (N_T-1)$ after the first iteration. The variable k is then incremented for the next iteration (i.e., k=k+1) and the variable i is again set as $i=d_k$ (step 436). The process then returns to step 422 to recover the next data stream.

The processing shown in FIG. 4 is thus repeated on the modified symbol streams to recover the remaining data streams. In particular, steps 422 through 426 are performed for each data stream to be recovered, and steps 430 through 436 are performed if there is another data stream to be recovered.

For the first iteration, the received symbol streams are processed using the CCMI technique. And for each subsequent iteration, the modified symbol streams (i.e., after the interference cancellation) are processed using the CCMI technique. The processing for each iteration proceeds in similar manner with the proper substitution for the input symbol streams. At each iteration subsequent to the first iteration, the interference due to the data streams recovered in the previous iterations is assumed to be cancelled, and the dimensionality of the composite channel matrix is reduced.

The CCMI-SC receiver processing technique is described in further detail in the aforementioned U.S. patent application Ser. Nos. 09/993,087, 09/854,235, 09/826,481, and 09/956,449.

For the CCMI-SC technique, the post-detection SNR of data stream $x_i$ may be expressed as:

$$\gamma_{ccmi-sc}(i) = \frac{P_i}{\tilde{r}_{ii}\sigma^2}, \quad \text{for } \forall i \in D \qquad \text{Eq (16)}$$

where $\tilde{r}_{ii}$ is the i-th diagonal element of $\underline{R}_k^{-1}$, and the matrices applied at the receiver, $\underline{C}_k$ and $\underline{R}_k^{-1}$, are re-determined at each stage of the detection process since these matrices change as the data streams are detected and the interference they cause to the other data streams is removed.

When throughput is a monotonically increasing function of the post-detection SNRs, as shown in equation (5), the order in which the data streams are recovered at the receiver may or may not have an impact on the overall spectral efficiency, depending on the type of receiver employed. For the CCMI-SC receiver, changing the detection order affects the overall spectral efficiency.

Since different detection orders may be associated with different spectral efficiencies for the CCMI-SC receiver, a number of detection orders may be evaluated to determine the specific detection order that provides the best spectral efficiency among the ones evaluated. An exhaustive search may also be performed over all possible detection orders to obtain the specific detection order that achieves the highest possible spectral efficiency. In any case, the transmit power may be adjusted to achieve the required post-detection SNRs for the detection order with the best spectral efficiency.

Figure 5:
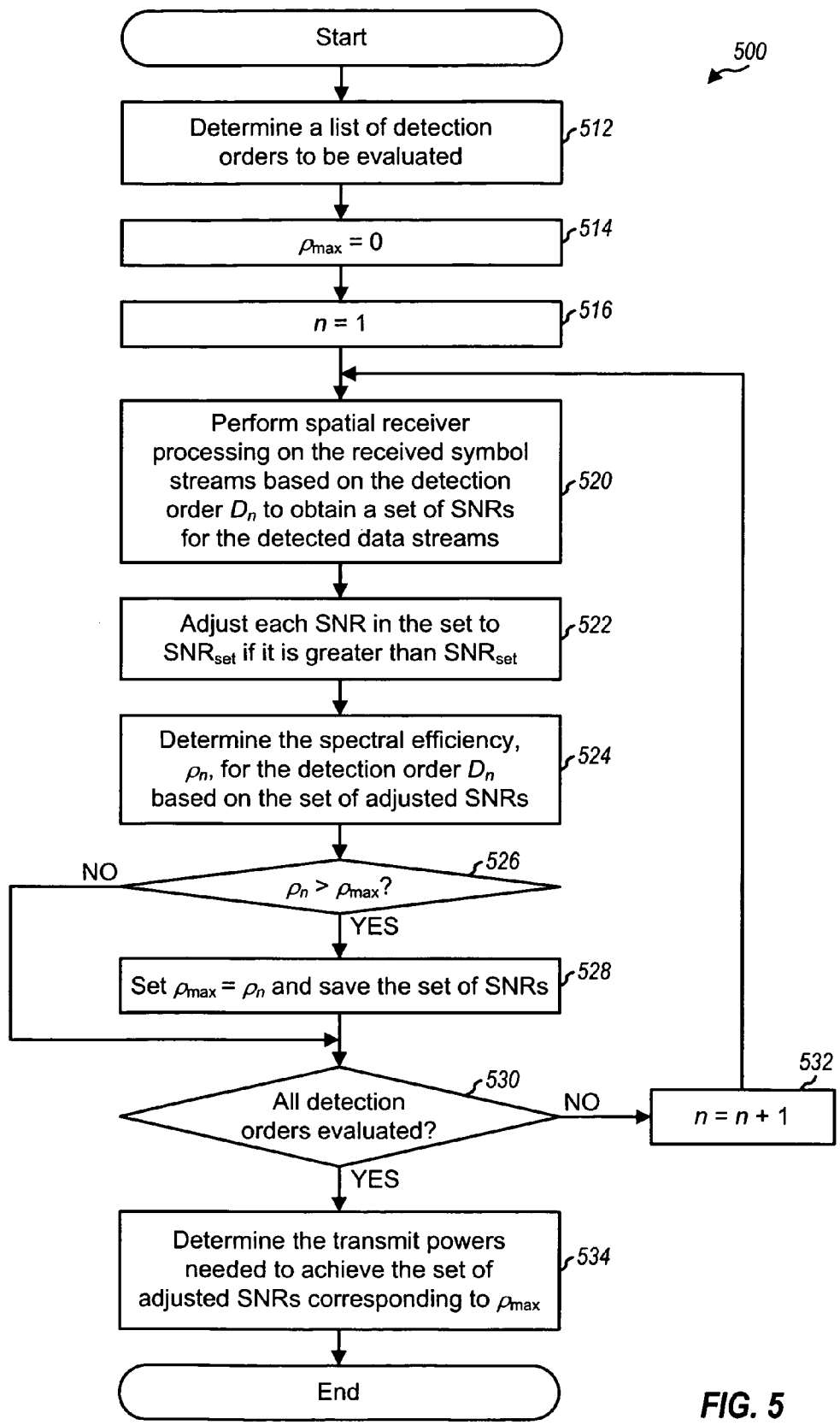
FIG. 5 is a flow diagram of a process for maximizing spectral efficiency while minimizing the total required transmit power for the CCMI-SC receiver.

FIG. 5 is a flow diagram of a process 500 for maximizing spectral efficiency while minimizing the total required transmit power for the CCMI-SC receiver. Initially, a list of detection orders to be evaluated is determined (step 512). In one embodiment, all possible detection orders are evaluated. In this case, for a system with $N_S$ data streams, there are $N_S$ factorial ($N_S!$) possible detection orders. The variable used to denote the maximum spectral efficiency achieved by all evaluated detection orders is initialized to zero (i.e., $\rho_{max}=0$) (step 514), and the variable n used to denote the iteration number is initialized to one (i.e., n=1) for the first iteration (step 516). The first detection order is then evaluated starting at step 520.

For the current detection order, $D_n$, to be evaluated, the received symbol streams are initially processed using the CCMI-SC technique and based on that detection order to obtain a set of post-detection SNRs for the detected data streams (step 520). Step 520 may be performed using the process shown in FIG. 4. For each post-detection SNR in the set that is greater than $\gamma_{set}$, the post-detection SNR is adjusted by setting it to $\gamma_{set}$ (i.e., $\gamma_{post}(i)=\gamma_{set}$) (step 522). The total spectral efficiency, $\rho_n$, for all detected data streams for the current detection order is then determined based on the adjusted post-detection SNRs, as shown in equations (5) and (6) (step 524).

A determination is then made whether or not the spectral efficiency, $\rho_n$, for the current detection order is higher than the best spectral efficiency obtained thus far (step 526). If the answer is no, then the process proceeds to step 530. Otherwise, the spectral efficiency for the current detection order is saved as the new best spectral efficiency (i.e., $\rho_{max}=\rho_n$), and the set of post-detection SNRs for this detection order is also saved (step 528).

A determination is then made whether or not all detection orders in the list have been evaluated (step 530). If the answer is no, then the variable n is incremented for the next iteration (i.e., n=n+1) (step 532), and the process returns to step 520 to evaluate the next detection order. Otherwise, if all detection orders have been evaluated, then the transmit power needed to achieve the post-detection SNRs corresponding to the best spectral efficiency is determined (step 534). Step 534 may be performed as shown in FIG. 3. The process then terminates.

For the CCMI-SC technique, when $N_S=2$, the highest spectral efficiency results when the data stream with the smaller post-detection SNR is recovered first and the one with the higher post-detection SNR is recovered last. For $N_S>2$, the optimality of the min-to-max $\gamma_{post}$ detection order decreases as the number of data streams, $N_S$, increases.

The maximum spectral efficiency, $\rho_{max}$, obtained for all evaluated detection orders, as determined by the process shown in FIG. 5, uses the adjusted post-detection SNR of $\gamma_{post}=\gamma_{set}$ for the detected data streams whose initial post-detection SNRs exceeded $\gamma_{set}$. The transmit power that achieves the set of adjusted post-detection SNRs corresponding to $\rho_{max}$ is then determined. Because the detected data streams are decoupled at the output of the CCMI-SC receiver, changing the transmit power of one data stream does not affect the post-detection SNR of any other data stream. Thus, the determination of the transmit power that achieves an adjusted post-detection SNR of $\gamma_{set}$ can be made independently for each data stream whose initial post-detection SNR exceeds $\gamma_{set}$.

The process shown in FIG. 3 may be used to determine the transmit powers needed to achieve the set of adjusted post-detection SNRs corresponding to the maximum spectral efficiency, $\rho_{max}$. For each initial post-detection SNR in the set that is greater than $\gamma_{set}$, the new transmit power, $\hat{P}_i$, to be used for the data stream to achieve $\gamma_{post}(i)=\gamma_{set}$ may be expressed as:

$$\hat{P}_i = \frac{\gamma_{set}}{\gamma_{post}(i)} P_i, \qquad \text{Eq (17)}$$

where $\gamma_{post}(i)=\gamma_{ccmi-sc}(i)$ for the CCMI-SC technique.

The result of the power adjustment in FIG. 3 is a set of transmit powers, $\{\hat{P}_i\}$, for $i \in D$, to be used for the data streams. This set includes transmit powers that have been adjusted to achieve $\gamma_{set}$. The total power saved for the new transmit powers may be determined based on equation (15).

Power Control for MMSE Receiver

For the MMSE spatial receiver processing technique, the transmitter can also transmit an independent data stream from each transmit antenna. The receiver performs a multiplication of the received vector, $\underline{y}$, with two matrices, $\underline{M}$ and $\underline{D}_v^{-1}$, to derive an unbiased MMSE estimate, $\hat{\underline{x}}_i$, of the transmit vector, $\underline{x}$. The unbiased MMSE estimate may be expressed as:

$$\hat{\underline{x}}=\underline{D}_v^{-1}\underline{M}\underline{y} \qquad \text{Eq (18)}$$

where $$\underline{y}=\underline{x}+\underline{n};$$

$$\underline{M}=\underline{C}^T(\underline{C}\underline{C}^T+\underline{\Lambda}_n)^{-1}; \text{ and}$$

$$\underline{D}_v^{-1}=\text{diag}(1/v_{11}, 1/v_{22}, \ldots 1/v_{N_T N_T}),$$

where $v_{ii}$ are the diagonal elements of the matrix $\underline{V}$, which is defined as:

$$\underline{V}=\underline{M}\underline{C}. \qquad \text{Eq (19)}$$

The matrix $\underline{M}$ is selected such that the mean square error between the MMSE estimate, $\hat{\underline{x}}$, and the transmitted vector, $\underline{x}$, is minimized. The matrix $\underline{D}_v^{-1}$ is used to ensure that $\hat{\underline{x}}$ is an unbiased estimate of $\underline{x}$.

For the MMSE technique, the post-detection SNR of data stream $x_i$ may be expressed as:

$$\gamma_{mmse}(i) = \frac{v_{ii}}{1-v_{ii}} P_i, \text{ for } \forall i \in D, \qquad \text{Eq (20)}$$

where $P_i$ is the transmit power for data stream $x_i$ and $v_{ii}$ is the i-th diagonal element of the matrix $\underline{V}$. Equation (20) may be rewritten as:

$$\gamma_{mmse}(i) = \frac{P_i}{\alpha_i}, \qquad \text{Eq (21)}$$

where $$\alpha_i = \frac{1-v_{ii}}{v_{ii}}.$$

It can be observed in equations (20) and (21) that the post-detection SNR of data stream $x_i$ is a linear function of the transmit power $P_i$ for data stream $x_i$.

The MMSE receiver processing technique is described in further detail in the aforementioned U.S. patent application Ser. Nos. 09/993,087, 09/854,235, 09/826,481, and 09/956,449.

Power control may also be used for the MMSE receiver to maximize spectral efficiency while minimizing transmit power. The MMSE processing provides a set of post-detection SNRs for the detected data streams. If the post-detection SNR of any given data stream is greater than $\gamma_{set}$, then the transmit power for the data stream may be adjusted to reduce transmit power without impacting spectral efficiency.

One property of the MMSE technique is that it does not decorrelate the transmitted data streams. Thus, the post-detection SNR of one data stream may be a function of the transmit powers of any of the other data streams. Because the MMSE technique does not decorrelate the data streams, a change in the transmit power of one data stream has the potential to affect the post-detection SNRs of all the other data streams. The power control for the MMSE receiver may then be performed iteratively to achieve the desired results.

Figure 6:
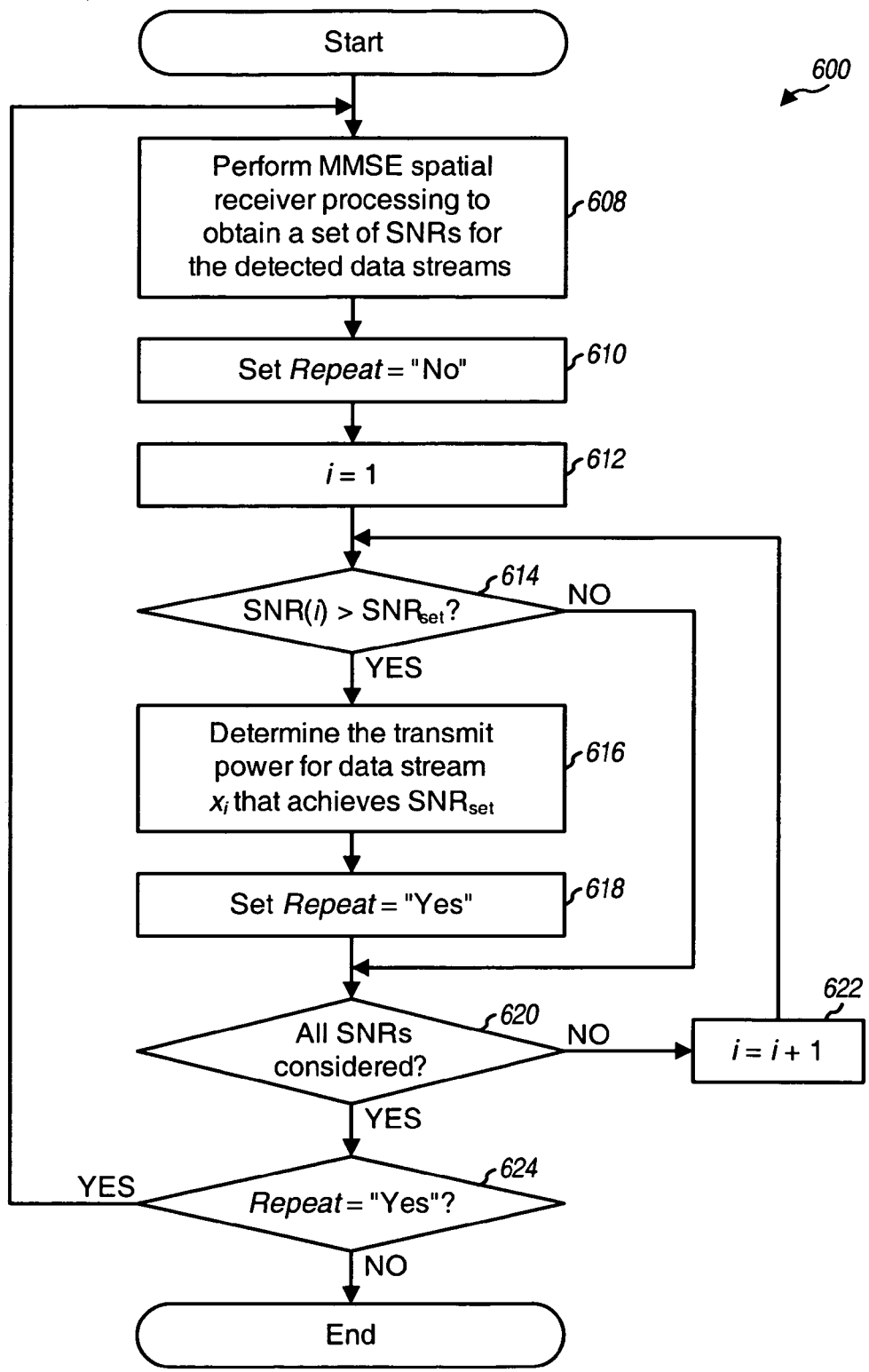
FIG. 6 is a flow diagram of a process for adjusting the transmit power to achieve a set of post-detection SNRs for an MMSE receiver.

FIG. 6 is a flow diagram of a process 600 for adjusting the transmit power to achieve a set of post-detection SNRs for the MMSE receiver. Process 600 determines the minimum total transmit power needed to achieve a set of post-detection SNRs that maximize spectral efficiency for the MMSE receiver. Initially, the MMSE spatial receiver processing is performed on the received symbol streams to obtain a set of post-detection SNRs for the detected data streams (step 608). A variable Repeat used to indicate whether or not to repeat the power adjustment is set to "No" (step 610), and the variable i used to denote the data stream number is initialized to one (i.e., i=1) (step 612). Each post-detection SNR in the set is then examined and the new transmit power, $\hat{P}_i$, to use for the corresponding data stream is determined starting at step 614.

For each data stream, a determination is first made whether or not the post-detection SNR, $\gamma_{post}(i)$, is greater than $\gamma_{set}$ (step 614). Alternatively, the power adjustment may only be made if $\gamma_{post}(i)$ is greater than $\gamma_{set}$ plus some delta (i.e., $\gamma_{post}(i) > (\gamma_{set} + \gamma_{66})$). If the answer is no, then the transmit power for this data stream is not adjusted (i.e., $\hat{P}_i = P_i$) and the process proceeds to step 620. Otherwise, the new transmit power, $\hat{P}_i$, for data stream $x_i$ that achieves $\gamma_{post}(i) = \gamma_{set}$ is determined (step 616). The relationship between $\hat{P}_i$ and $\gamma_{set}$ may be expressed as:

$$\gamma_{set} = \frac{\hat{P}_i}{\alpha_i}. \qquad \text{Eq (22)}$$

Using equation (22) together with equation (21) for the MMSE technique, the transmit power to use for data stream $x_i$ may be expressed as:

$$\hat{P}_i = \frac{\gamma_{set}}{\gamma_{post}(i)} P_i, \qquad \text{Eq (23)}$$

where $\gamma_{post}(i) = \gamma_{mmse}(i)$ for the MMSE receiver.

Since decreasing the transmit power for data stream $x_i$ may increase the post-detection SNR of some other data stream to be higher than $\gamma_{set}$, the variable Repeat is set to "Yes" (step 618). This would then result in the re-evaluation of the set of adjusted post-detection SNRs via one more subsequent iteration through the set if the transmit power for any data stream is reduced in the current iteration.

A determination is then made whether or not all post-detection SNRs in the set have been considered (step 620). If the answer is no, then the variable i is incremented (step 622), and the process returns to step 614 to evaluate another post-detection SNR in the set.

Otherwise, if all SNRs in the set have been considered, then a determination is made whether or not Repeat is set to "Yes" (step 624). If the answer is no, indicating that the transmit power was not adjusted for any data stream in the last iteration, then the process terminates. Otherwise, the process returns to step 608 to perform another iteration through the set of post-detection SNRs.

For each subsequent iteration to possibly readjust the transmit powers for the data streams, the transmit powers, $\{\hat{P}_i\}$, for i∈D, determined in the prior iteration are used for the MMSE processing. In particular, the new amplitudes, $\{A_i\}$, for i∈D, of the data streams are initially determined based on the new transmit powers, $\{\hat{P}_i\}$, for i∈D, to derive a new composite channel matrix, $\underline{C}$. The matrices $\underline{M}$ and $\underline{D}_v^{-1}$ are then updated based on the new composite channel matrix, as shown in equation (18). The updated matrices $\underline{M}$ and $\underline{D}_v^{-1}$ are then used for the MMSE processing of the received symbol streams in step 608.

The power control process shown in FIG. 6 results in a set of transmit powers, $\{\hat{P}_i\}$, for i∈D, to be used for the data streams. This set includes the transmit powers that have been adjusted to achieve $\gamma_{set}$. The total power saved may be determined using equation (15).

Power Control for MMSE-SC Receiver

The MMSE technique may also be used in conjunction with successive interference cancellation. For the MMSE-SC technique, the received vector, $\underline{y}$, is processed in a recursive manner using MMSE spatial receiver processing to recover one data stream at a time based on a particular detection order. The MMSE-SC technique may be implemented using the process shown in FIG. 4, except that MMSE spatial receiver processing is performed in step 422 instead of CCMI spatial receiver processing. The result of the processing shown in FIG. 4 is a set of post-detection SNRs for the detected data streams.

For the MMSE-SC technique, the post-detection SNR of data stream $x_i$ may be expressed as shown in equation (20), which is:

$$\gamma_{mmse-sc}(i) = \frac{v_{ii}}{1 - v_{ii}} P_i, \text{ for } \forall\, i \in D.$$

However, the matrix $\underline{V}$ is different for different stages of the MMSE-SC receiver. The post-detection SNR of data stream $x_i$ may thus be different depending on the particular stage in which it is recovered.

One property of the MMSE-SC receiver is that it does not decorrelate the data streams. This is because the underlying MMSE technique used for the spatial receiver processing at each stage does not decorrelate the data streams. For each stage of the MMSE-SC receiver, one data stream is recovered and the post-detection SNR of this data stream may be a function of the transmit powers of all the data streams not yet recovered. Once this data stream has been recovered, its interference effect on the remaining, not yet recovered data streams is estimated and removed. If the interference cancellation is effective, then this data stream has no (or minimal) effect on subsequently recovered data streams, and the transmit power of this data stream does not effect the post-detection SNRs of subsequently recovered data streams. Thus, adjusting the transmit power of a given data stream $x_i$ may affect the post-detection SNRs of the data streams recovered prior to $x_i$ but not those recovered after $x_i$ (again, if the interference cancellation is effectively performed). To reduce computational complexity, the transmit powers for the data streams may be adjusted using reverse detection order.

Figure 7:
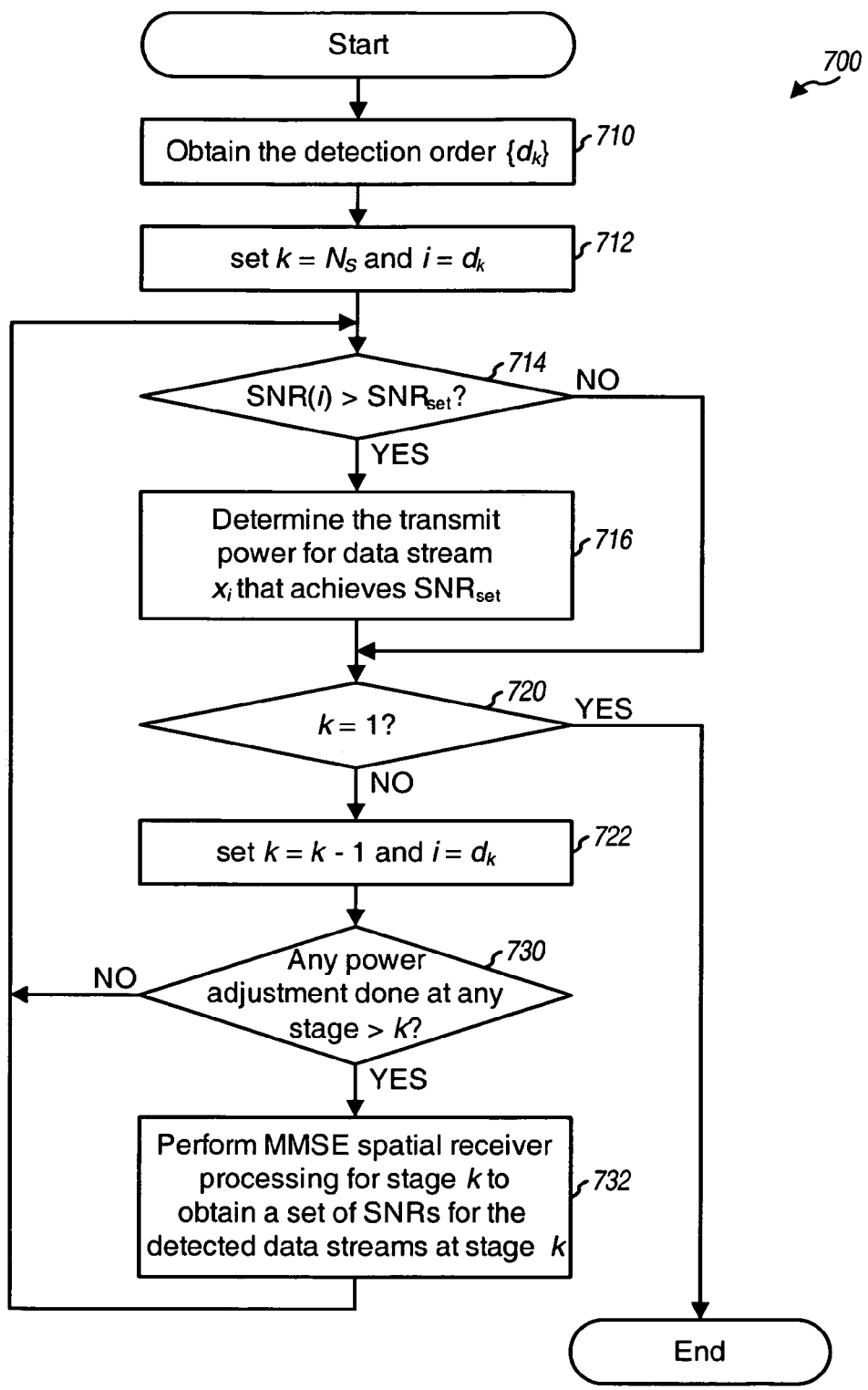
FIG. 7 is a flow diagram of a process for adjusting the transmit power to achieve a set of post-detection SNRs for an MMSE-SC receiver.

FIG. 7 is a flow diagram of a process 700 for adjusting the transmit power to achieve a set of post-detection SNRs for the MMSE-SC receiver. This set of SNRs may be initially obtained by performing the process shown in FIG. 4 for the MMSE-SC receiver, and may include SNRs that exceed $\gamma_{set}$.

Initially, the specific detection order corresponding to the set of post-detection SNRs is obtained (step 710). This detection order may be represented as $D=\{d_1, d_2, \ldots d_{N_S}\}$, where $d_k$ is the index of the data stream recovered at stage k of the MMSE-SC receiver. The variable k used to denote the stage number is initialized to that of the last recovered data stream (i.e., $k=N_S$) and the index i of the data stream $x_i$ detected at stage k is set as $i=d_k$ (step 712).

A determination is first made whether or not the post-detection SNR, $\gamma_{post}(i)$, for data stream $x_i$ is greater than $\gamma_{set}$ (step 714). Alternatively, the power adjustment may be made only if $\gamma_{post}(i)$ is greater than $\gamma_{set}$ by some delta amount. If the answer is no, then the transmit power for this data stream is not adjusted (i.e., $\hat{P}_i = P_i$) and the process proceeds to step 720. Otherwise, the new transmit power, $\hat{P}_i$, to be used for data stream $x_i$ to achieve $\gamma_{post}(i)=\gamma_{set}$ is determined as shown in equation (23) (step 716).

A determination is then made whether or not all data streams have been considered (step 720). If the answer is yes, then the process terminates. Otherwise, the variable k is decremented and the data stream index i is set as $i=d_k$ (step 722), and the next prior stage is evaluated.

At any given stage k, a decrease in the transmit power for any later-recovered data stream may increase the post-detection SNR of the data stream recovered in this stage to be higher than $\gamma_{set}$. Thus, a determination is made whether or not there has been a transmit power adjustment for any data stream recovered subsequent to stage k (step 730). If the answer is no, then the process returns to step 714 to evaluate the data stream for the current stage k. Otherwise, if there has been a power adjustment, then the MMSE spatial receiver processing is performed for stage k on the received symbol stream to obtain the post-detection SNR for the data stream detected at stage k (step 732). This may be achieved by first determining the data streams that have not yet been recovered at stage k, which are denoted as $D_k=\{d_k, \ldots d_{N_T}\}$. The transmit power originally used for the data stream detected at stage k is then used together with the transmit powers of the data streams detected after stage k (at least one of which has changed) to determine the post-detection SNR for the data stream detected at stage k. In performing the MMSE-SC processing in reverse order, the composite channel matrix increases for each stage and becomes the original dimension of $N_R \times N_T$ for the first stage.

The result of the power adjustment in FIG. 7 is a set of transmit powers, $\{\hat{P}_i\}$, for $i \in D$, to be used for the data streams. This set includes transmit powers that have been adjusted to achieve $\gamma_{set}$. The total power saved for the new transmit powers may be determined based on equation (15).

Another property of the MMSE-SC receiver is that detection order has no effect on spectral efficiency when there is no upper limit on post-detection SNRs (i.e., $\gamma_{set}$ does not exist). For the MMSE-SC receiver, varying the detection order will produce different post-detection SNRs for the detected data streams, but the overall spectral efficiency for all data streams will remain the same. However, if there is an upper limit on post-detection SNRs and power control is employed, then different detection orders may be associated with different overall spectral efficiencies. In this case, a number of different detection orders may be evaluated to determine the one that provides the best spectral efficiency among the ones evaluated. Alternatively, an exhaustive search may be performed over all possible detection orders to determine the specific detection order that achieves the highest spectral efficiency.

The process shown in FIG. 5 may also be used to maximize spectral efficiency while minimizing the total required transmit power for the MMSE-SC receiver. Again, a list of detection orders to be evaluated may be initially determined (step 512).

For each detection order to be evaluated, the received symbol streams are initially processed using the MMSE-SC technique and based on that detection order to obtain a set of post-detection SNRs for the detected data streams (step 520). Each SNR in the set that is greater than $\gamma_{set}$ is then adjusted to $\gamma_{set}$ (step 522), and the transmit power is thereafter adjusted accordingly to achieve the adjusted SNR. Because the post-detection SNR of a given data stream may be a function of the transmit powers of the other data streams when using MMSE processing, an adjustment in the transmit power of one data stream may then cause the post-detection SNRs of the other data streams to change. However, for the MMSE-SC technique, a change in the transmit power of one data stream may only affect the post-detection SNR of a data stream that has been detected earlier. This behavior may be taken into account by using the process shown in FIG. 7 to perform the SNR adjustment. However, these changes in SNRs typically have a marginal effect on the overall spectral efficiency and may be ignored. In any case, the spectral efficiency for each detection order is determined (step 524).

All detection orders in the list may be evaluated, one at a time, and the set of post-detection SNRs corresponding to the specific detection order that yields the highest spectral efficiency, $\rho_{max}$, is saved (step 528). The transmit powers needed to achieve the set of adjusted post-detection SNRs corresponding to $\rho_{max}$ are then determined (step 534), for example, using the process shown in FIG. 7.

The power control described herein may be implemented in various manners. In one implementation, a pilot is transmitted along with each data stream to allow the receiver to estimate the post-detection SNR of the data stream. The pilot may be transmitted at the peak transmit power allowed for the data stream (i.e., $P_i = P_{peak}$). At the receiver, the received symbol streams are processed and the post-detection SNRs of the detected data streams reflect the SNRs that would have been achieved if the peak transmit powers are used for the data streams. Power control is then performed as described above to determine the minimum transmit powers needed to achieve $\gamma_{set}$ for the detected data streams at the receiver. The power adjustments for the data streams would then be indicative of the amount of back-off from the peak transmit power.

In another implementation, the post-detection SNRs of the detected data streams are reflective of the transmit powers actually used for the data streams. The power adjustments for the data streams would then be indicative of the difference (or delta) from the current transmit powers.

Power Control for Discrete Data Rates

In the above description, it is assumed that spectral efficiency is a continuous function of post-detection SNR, as shown in equation (5) and plot 212 in FIG. 2. Furthermore, the system described above allows the spectral efficiency to be any real value that does not exceed the $\rho_{set}$. A typical communication system, however, may only support a set of discrete data rates for each data stream. The data rate sets may or may not be the same for all data streams. However, for simplicity, one data rate set is assumed to be used for all data streams.

Figure 8:
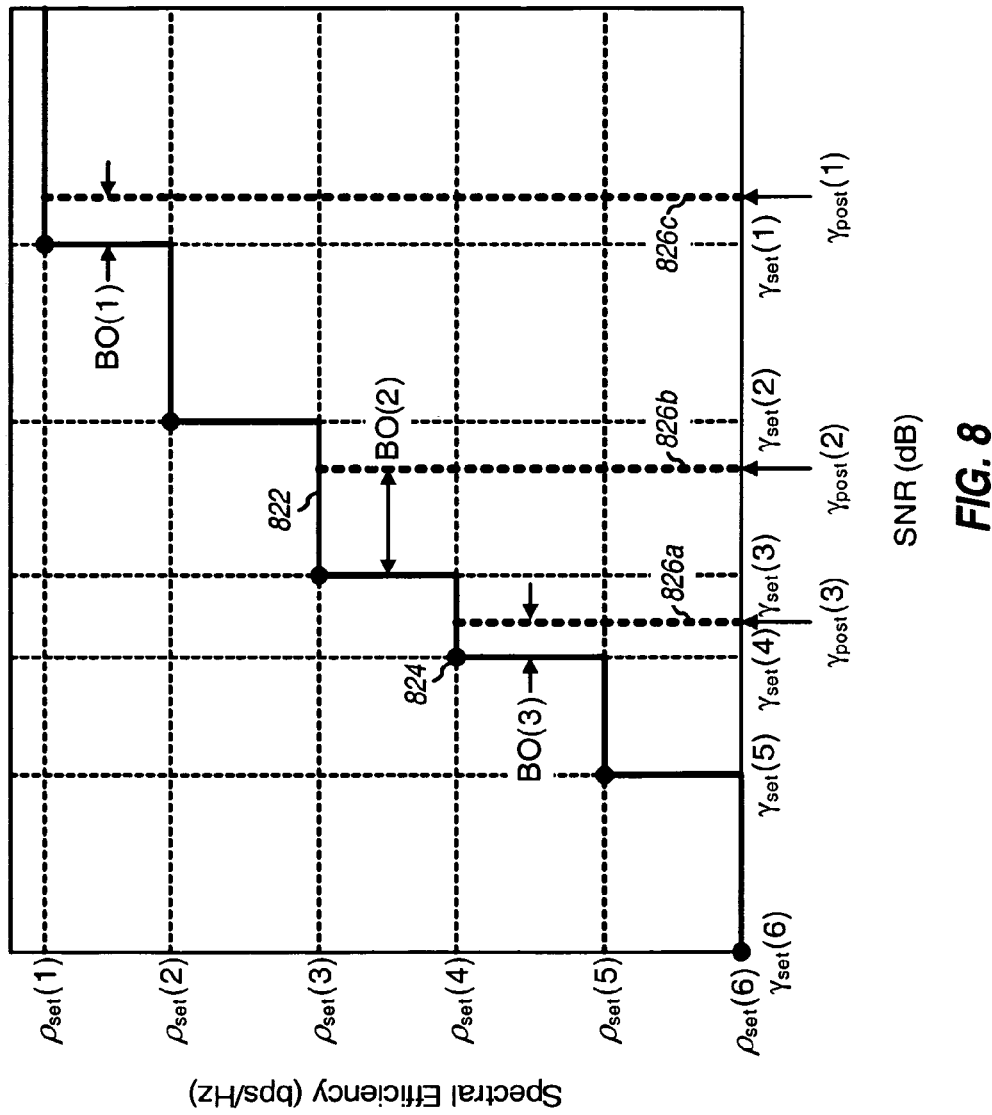
FIG. 8 shows a plot of spectral efficiency versus post-detection SNR for a communication system that supports a set of discrete data rates.

FIG. 8 shows a plot of spectral efficiency versus post-detection SNR for a communication system that supports a set of discrete data rates. This set of data rates may be converted to a set of discrete spectral efficiencies and is further associated with a set of discrete post-detection SNRs needed to achieve the target FER for a given data stream.

In FIG. 8, the discrete spectral efficiencies are labeled as $\rho_{set}(r)$ on the vertical axis, where r is used to enumerate through the R discrete data rates (i.e., $1 \leq r \leq R$). The spectral efficiency function for this system is shown by plot 822 (the thick solid line). The highest spectral efficiency is $\rho_{set}(1)$ and corresponds to $\gamma_{set}(1)$. The discrete operating points at $((\gamma_{set}(r), \rho_{set}(r))$, for $1 \leq r \leq R$, correspond to the minimum post-detection SNRs necessary to achieve the corresponding spectral efficiencies, and are shown by the solid circles 824.

For a communication system with the spectral efficiency function shown in FIG. 8, an increase in post-detection SNR may not offer an improvement in spectral efficiency. Therefore, utilizing more transmit power than necessary to achieve the target FER at the operating spectral efficiency would result in an ineffective use of the additional transmit power. Even though the excess transmit power may result in a lower FER, this improvement in FER may not be considered substantial since the target FER has already been achieved.

The power control techniques described above may also be used for systems that support discrete data rates. The objective of the power control is then to determine the transmit power for each data stream that corresponds to the minimum SNR necessary to achieve the operating spectral efficiency. New transmit powers may be determined for all data streams that are not operating at the discrete $\gamma_{set}(r)$ points.

FIG. 8 also shows an example whereby the initial operating points of three data streams, shown by dashed lines 826a through 826c, do not lie on the discrete operating points. The transmit power for each of these data streams may be reduced by a backed-off amount, BO(i), for $i \in D$, so that the adjusted post-detection SNR lies on top of $\gamma_{set}(r)$ for the discrete operating point. This then results in the data stream operating at a lower transmit power without incurring a loss in spectral efficiency. As shown in FIG. 8, the post-detection SNR for data stream $x_i$ may be backed off by BO(1), to achieve $\gamma_{set}(1)$ required for spectral efficiency $\rho_{set}(1)$, the post-detection SNR for data stream $x_2$ may be backed off by BO(2), to achieve $\gamma_{set}(3)$ required for spectral efficiency $\rho_{set}(3)$, and the post-detection SNR for data stream $x_3$ may be backed off by BO(3), to achieve $\gamma_{set}(4)$ required for spectral efficiency $\rho_{set}(4)$.

For the CCMI and CCMI-SC receivers, since the data streams are decoupled at the output of these receivers, the transmit power of each data stream may be adjusted by the respective backed-off amount, BO(i), without affecting the post-detection SNRs of the other data streams.

For the MMSE receiver without successive cancellation, the post-detection SNR of each data stream may be a function of the transmit powers on all data streams, as noted above. This coupling may not allow all of the post-detection SNRs to be adjusted to lie exactly on top of the ideal operating points. In this case, the post-detection SNRs may be adjusted such that they exceed $\gamma_{set}(r)$ by the smallest amount possible. Again, a number of possible adjustments may be evaluated to determine the best set of backed-off amounts.

For the MMSE-SC receiver, the post-detection SNRs of the data streams may be adjusted in reverse detection order, as described above. The post-detection SNR of each data stream may then be adjusted by the backed-off amount, BO(i), to achieve the discrete operating point, except for possibly the first data stream to be recovered.

Power Control for Specified Spectral Efficiency

The techniques described above may be used to achieve the maximum spectral efficiency for a given total transmit power, $P_{tot}$. For a MIMO system that transmits using partial CSI, the optimization depends on the specific spatial receiver processing technique used at the receiver as well as the achieved spectral efficiency of the coding and modulation schemes available to both the transmitter and receiver.

The techniques described above may also be adapted to determine the minimum amount of transmit power needed to achieve a specified spectral efficiency. For a MIMO system, instead of maximizing spectral efficiency, it may be possible for the system to be operated in a manner whereby the data rate or spectral efficiency of each user is controlled instead of the transmit power. In this case, the system may specify a particular data rate and an objective of the transmitter is then to achieve this specified data rate using the minimum amount of transmit power. Again, the optimization depends on the specific spatial receiver processing technique used at the receiver as well as the performance of the system's coding and modulation schemes.

A specific scheme for determining the minimum amount of transmit power required to achieve a specified spectral efficiency for a MIMO system utilizing partial CSI may be implemented as follows. For this MIMO system, it is assumed that the transmitter employs $N_T$ transmit antennas, each of which is capable of transmitting at up to a maximum transmit power of $P_{max}$. The total transmit power for all $N_T$ transmit antennas is then $P_{tot} = N_T \cdot P_{max}$.

For this scheme, the set of transmit antennas that achieves the maximum spectral efficiency is initially determined based on the assumption that the peak transmit power, $P_{max}$, is used for each antenna. This set is denoted as the "optimal" set O. The spectral efficiency achieved by a given transmit antenna is dependent on the post-detection SNR achieved by that antenna, which in turn is dependent on the specific receiver processing technique used at the receiver. For a receiver processing technique that employs successive interference cancellation, different detection orders may result in different post-detection SNRs for the transmit antennas. In that case, different detection orders may be evaluated to determine the set of transmit antennas that achieves the maximum spectral efficiency. Since the data stream on each transmit antenna acts as interference to the data streams on the other transmit antennas, the optimal set O may include less than $N_T$ transmit antennas if successive interference cancellation is not used, and typically includes all $N_T$ transmit antennas if successive interference cancellation is used. Thus, the optimal set O may include all $N_T$ transmit antennas or only a subset of these antennas.

In an embodiment, the specified spectral efficiency is achieved by utilizing the minimum number of transmit antennas. For this embodiment, the post-detection SNRs of the transmit antennas in set O are first ranked in order from the highest to the lowest post-detection SNR. From the ranked transmit antennas in set O, the minimum number of transmit antennas, $N_{req}$, needed to achieve the specified spectral efficiency is then determined. This may be achieved by selecting one transmit antenna in set O at a time, starting with the best one having the highest post-detection SNR, and maintaining a running total of the spectral efficiencies of all selected transmit antennas. The set of transmit antennas associated with an aggregate spectral efficiency that is greater than or equal to the specified spectral efficiency is then denoted as the required set R. Set R includes $N_{req}$ transmit antennas, where $N_{req} \leq N_T$.

For the $N_{req}$ transmit antennas in set R, the minimum amount of transmit power required to achieve the specified spectral efficiency is then determined. In an embodiment, the same back-off is applied uniformly to all $N_{req}$ transmit antennas and the same amount of transmit power is used for all $N_{req}$ transmit antennas. This back-off may be determined in an iterative manner by adjusting the transmit powers for the $N_{req}$ transmit antennas either up or down until the specified spectral efficiency is achieved with the minimum amount of transmit power. For a system that transmits data using a set of discrete data rates, different transmit powers may be used for the $N_{req}$ transmit antennas, which may be determined as described above.

Alternatively, instead of achieving the specified spectral efficiency with the minimum number of transmit antennas as described above, more than $N_{req}$ transmit antennas may be selected for use, and the transmit power for each selected transmit antenna may be adjusted lower. Other schemes for determining the minimum amount of transmit power to achieve the specified spectral efficiency may also be implemented, and this is within the scope of the invention.

The determination of (1) the particular set of transmit antennas to use for data transmission and (2) the amount of transmit power to use for each selected transmit antenna may be made at either the transmitter or receiver. If the determination is made at the receiver, then the transmitter may be provided with control information indicative of the selected transmit antennas and their transmit powers to achieve the specified spectral efficiency.

Since the link condition may change over time, the transmit power to be used for the selected transmit antennas may be adjusted correspondingly to achieve the spectral efficiency in the presence of changing link condition. The post-detection SNRs of the data streams transmitted on the selected transmit antennas may be determined based on a particular (e.g., CCMI, CCMI-SC, MMSE, or MMSE-SC) spatial receiver processing technique. Each of the post-detection SNRs may be greater or less than the setpoint, $\gamma_{set}(i)$, needed to achieve the spectral efficiency designated for that transmit antenna. The transmit power for each selected transmit antenna may then be adjusted either up or down such that the adjusted post-detection SNR is at or near the setpoint, $\gamma_{set}(i)$. As noted above, for the MMSE receiver without successive cancellation, it may not be possible to set the post-detection SNRs exactly at the setpoints for all selected transmit antennas, in which case the adjustment may be made such that all selected transmit antennas achieve or exceed their setpoints while minimizing the amount of excess transmit power. The power adjustment may also be performed in the aggregate for all selected transmit antennas.

The receiver may provide power control information to the transmitter to allow the transmitter to adjust the transmit powers for the selected transmit antennas. For example, the receiver may provide a power control bit for each selected transmit antenna or one power control bit for all selected transmit antenna. Each power control bit may indicate an adjustment of the transmit power either up or down by some predetermined amount. Other power control mechanisms may also be employed, and this is within the scope of the invention.

Power allocation for a MIMO system is also described in U.S. patent application Ser. No. 10/056,275, entitled "Reallocation of Excess Power for Full Channel-State Information (CSI) Multiple-Input, Multiple-Output (MIMO) System," filed Jan. 23, 2002, assigned to the assignee of the present application and incorporated herein by reference.

Receiver

Figure 9A:
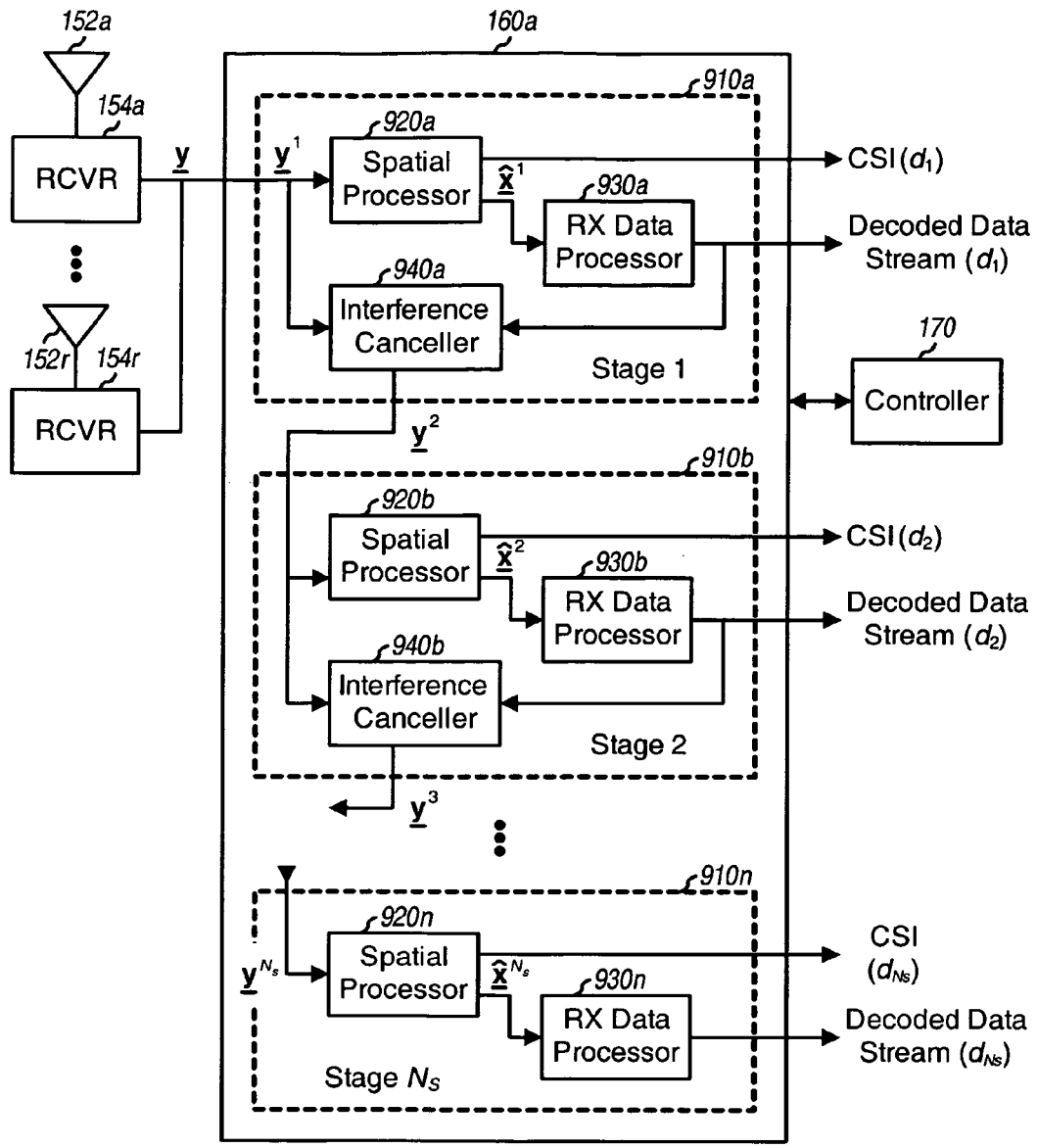
FIGS. 9A and 9B are block diagrams of a RX MIMO/data processor that respectively implements and does not implement the successive cancellation receiver processing technique.

FIG. 9A is a block diagram of a RX MIMO/data processor 160a capable of implementing the successive cancellation receiver processing technique. The transmitted signals from $N_T$ transmit antennas are received by each of $N_R$ antennas 152a through 152r and routed to a respective receiver 154. Each receiver 154 processes a respective received signal and provides a corresponding received symbol stream to RX MIMO/data processor 160a.

In the embodiment shown in FIG. 9A, RX MIMO/data processor 160a includes a number of successive (i.e., cascaded) receiver processing stages 910, one stage for each of the transmitted data streams to be recovered. Each receiver processing stage 910 (except for the last stage 910n) includes a spatial processor 920, an RX data processor 930, and an interference canceller 940, and the last stage 910n includes only spatial processor 920n and RX data processor 930n.

For the first receiver processing stage 910a, spatial processor 920a receives and processes the $N_R$ received symbol streams (denoted as the vector $\underline{y}$) from receivers 154a through 154r based on a particular (e.g., CCMI or MMSE) receiver processing technique to provide $N_T$ detected data streams (denoted as the vector $\hat{\underline{x}}^1$). One of the detected data streams is selected (e.g., the first stream in the detection order $D=\{d_1, d_2, \ldots d_{N_T}\}$) and provided to RX data processor 930a. Processor 930a further processes (e.g., demodulates, deinterleaves, and decodes) the selected detected data stream, $\hat{x}_i$, where $i=d_1$ for the first stage, to provide a decoded data stream. Spatial processors 920 further provide CSI for the detected data streams, which may be in the form of the post-detection SNRs described above.

For each of the second through last stages 910b through 910n, the spatial processor for that stage receives and processes the $N_R$ modified symbol streams from the interference canceller in the preceding stage to derive the detected data streams for the stage. Again, one of the detected data streams is selected and processed by the RX data processor to provide a decoded data stream for that stage.

For the first receiver processing stage 910a, interference canceller 940a receives the $N_R$ received symbol streams from receivers 154 (denoted as the vector $\underline{y}^1$). And for each of the second through second-to-last stages, the interference canceller in that stage receives the $N_R$ modified symbol streams from the interference canceller in the preceding stage. Each interference canceller also receives the decoded data stream from the RX data processor within the same stage, and performs the processing (e.g., encoding, interleaving, modulation, channel response, and so on) to derive $N_R$ remodulated symbol streams (denoted as the vector $\underline{i}$) that are estimates of the interference components due to the decoded data stream. The remodulated symbol streams are then subtracted from that stage's input symbol streams to derive $N_R$ modified symbol streams that include all but the subtracted (i.e., cancelled) interference components. The $N_R$ modified symbol streams are then provided to the next stage.

Figure 9B:
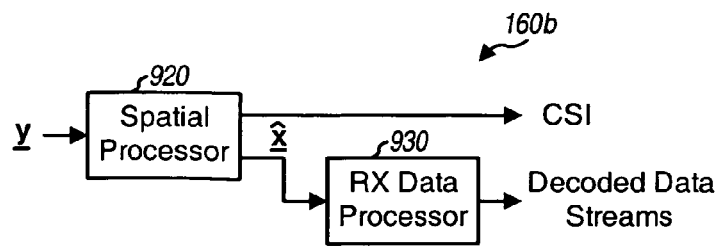

FIG. 9B is a block diagram of a RX MIMO/data processor 160b that does not implement the successive cancellation receiver processing technique. The received symbol streams (denoted as the vector $\underline{y}$) are provided to spatial processor 920 and processed based on a particular spatial receiver processing technique to provide the detected data streams (denoted as the vector $\hat{\underline{x}}$). RX data processor 930 then receives and processes the detected data streams to provide the decoded data streams. Spatial processor 920 further provides CSI for the detected data streams.

Figure 10A:
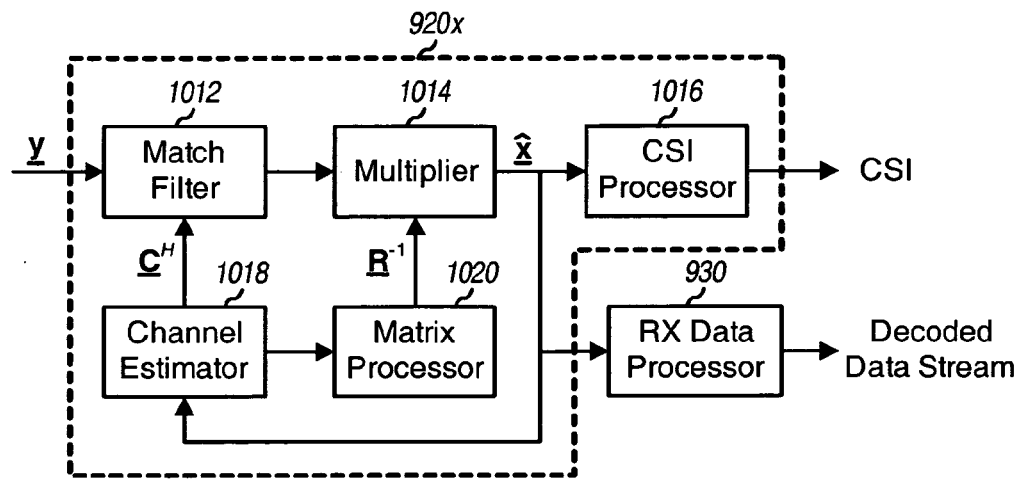
FIGS. 10A and 10B are block diagrams of two spatial processors that implement the CCMI and MMSE techniques, respectively.

FIG. 10A is a block diagram of an embodiment of a spatial processor 920x, which implements the CCMI technique. Spatial processor 920x may be used for each of spatial processors 920a through 920n in FIG. 9A and for spatial processors 920 in FIG. 9B. Within spatial processor 920x, the received or modified symbol streams (denoted as the vector $\underline{y}$) are initially filtered by a match filter 1012, which pre-multiplies the vector $\underline{y}$ with the conjugate-transpose composite channel matrix $\underline{C}^H$, as shown above in equation (7). A multiplier 1014 further pre-multiplies the filtered vector with the inverse square matrix $\underline{R}^{-1}$ to form an estimate $\hat{\underline{x}}$ of the transmitted vector $\underline{x}$, as shown above in equation (10).

The vector $\hat{\underline{x}}$ is provided to a channel estimator 1018 that estimates the channel response matrix $\underline{H}$. In general, the matrix $\underline{H}$ may be estimated based on symbols corresponding to pilot data or traffic data or both. Channel estimator 1018 then multiplies the channel coefficient matrix $\underline{H}$ with the diagonal matrix, $\underline{A}$, to obtain the composite channel matrix, $\underline{C}$. A matrix processor 1020 then derives the composite channel correlation matrix $\underline{R}$ according to $\underline{R}=\underline{C}^H\underline{C}$, as shown in equation (8). Channel estimator 1018 and matrix processor 1020 provide the matrices $\underline{C}^H$ and $\underline{R}^{-1}$, respectively, to match filter 1012 and multiplier 1014.

Spatial processor 920x provides one or more detected data streams to RX data processor 930, which further processes (e.g., demodulates, de-interleaves, and decodes) each detected data stream to provide a corresponding decoded data stream.

A CSI processor 1016 determines the CSI for the detected data streams, which may be in the form of the post-detection SNRs determined as shown in equation (12). The CSI may be used to determine the transmit power for the data streams.

Figure 10B:
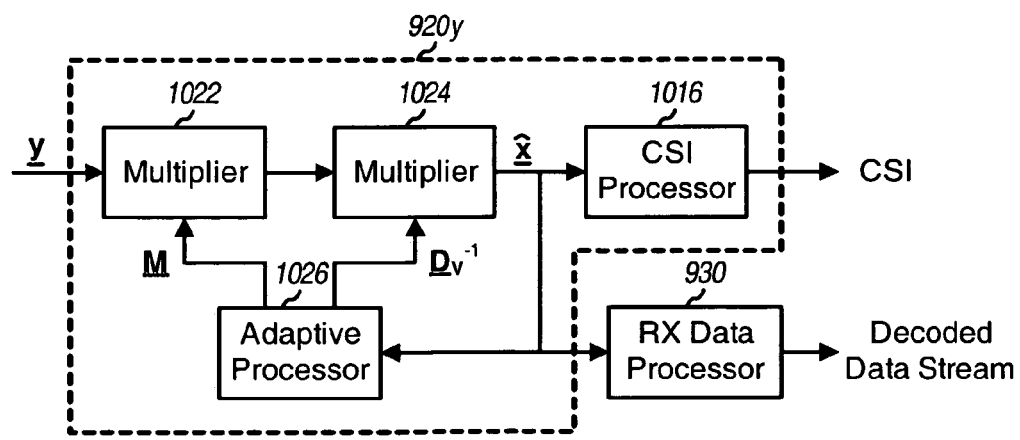

FIG. 10B shows an embodiment of a spatial processor 920y, which implements the MMSE technique. Similar to the CCMI technique, the matrices $\underline{H}$ and $\underline{\Lambda}_n$ may first be estimated based on the pilot and/or traffic data. The matrices $\underline{M}$ and $\underline{D}_v^{-1}$ are then determined according to equation (18).

Within spatial processor 920y, a multiplier 1022 initially pre-multiplies the received or modified symbol streams (denoted as the vector $\underline{y}$) with the matrix $\underline{M}$ to obtain an initial estimate of the transmitted vector $\underline{x}$, as shown in equation (18). A multiplier 1024 further pre-multiplies the initial estimate with the diagonal matrix $\underline{D}_v^{-1}$ to form an unbiased estimate $\hat{\underline{x}}$ of the transmitted vector $\underline{x}$, as also shown in equation (18). The unbiased estimate $\hat{\underline{x}}$ corresponds to the detected data streams. The unbiased estimate $\hat{\underline{x}}$ is further provided to an adaptive processor 1026, which derives the matrices $\underline{M}$ and $\underline{D}_v^{-1}$ based on equation (18).

Spatial processor 920y provides one or more detected data streams to RX data processor 930 for further processing. CSI processor 1016 determines CSI for the detected data streams, which again may be in the form of the post-detection SNRs.

The CCMI, CCMI-SC, MMSE, and MMSE-SC receivers are described in further detail in the aforementioned U.S. patent application Ser. Nos. 09/993,087, 09/854,235, 09/826,481, and 09/956,449. In FIGS. 9A and 9B, each spatial processor 920 may be replaced with a space-time processor, which may implement the DFE, MMSE-LE, or MLSE, for a dispersive channel within frequency selective fading.

The power control may be performed by both the transmitter and receiver systems. In an embodiment, the receiver system performs the spatial or space-time receiver processing on the received symbol streams to obtain the detected data streams, estimates the post-detection SNRs of the detected data streams, determines the power adjustment for each detected data stream, and provides information indicative of which data stream requires power adjustment. In one embodiment, the receiver system also provides the power adjustment amount for each data stream that needs adjusting. In another embodiment, the power adjustment amount is predetermined or fixed (e.g., 0.5 dB) and need not be reported.

Referring back to FIG. 1, at receiver system 150, controller 170 may receive the post-detection SNRs and determine the power adjustment. Controller 170 may then provide the power control information and possibly other information needed by the transmitter system to properly process and transmit the data streams, which are collectively referred to as partial CSI. The partial CSI may comprise the post-detection SNRs, the data rates and coding and modulation schemes to be used for the data streams, the power adjustments, and so on, or any combination thereof. The partial CSI is then processed by TX data processor 178, modulated by modulator 180, conditioned by transmitters 154, and transmitted via antennas 152.

At transmitter system 110, the transmitted signals from receiver system 150 are received by antennas 124. The received signals are then conditioned by receiver 122, demodulated by demodulator 140, and further processed by RX data processor 142 to recover the reported CSI, which is provided to controller 130. Controller 130 then provides various controls used to process (e.g., code and modulate) the data streams and adjust the transmit powers for these data streams.

The techniques described herein for controlling transmit power may be used for various multi-channel communication systems, including MIMO systems, OFDM systems, MIMO-OFDM systems, and so on. These techniques may be advantageously used for systems having a particular maximum allowed spectral efficiency, $\rho_{set}$, (as illustrated in FIG. 2) and for systems supporting one or more sets of discrete data rates for the data streams (as illustrated in FIG. 8).

The techniques described herein may also be used to control transmit power for each data stream, which may be transmitted on one or more transmission channels. Each data stream may be associated with a particular data rate and a particular coding and modulation scheme. For a multiple-access communication system, each data stream may be associated with a different receiver.

For clarity, the power control is specifically described for the CCMI, CCMI-SC, MMSE, and MMSE-SC receiver processing techniques. The power control techniques described herein may also be used for other receiver processing techniques, and this is within the scope of the invention. For example, these power control techniques may be used in conjunction with space-time receiver processing techniques.

The power control techniques described herein may be implemented by various means. For example, these techniques may be implemented in hardware, software, or a combination thereof. For a hardware implementation, the elements used to control transmit power for the data streams may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the power control may be implemented with modules (e.g., procedures, functions, and so on) that perform the functions described herein. The software codes may be stored in a memory unit (e.g., memory 132 and/or 172 in FIG. 1) and executed by a processor (e.g., controller 130 and/or 170). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling transmit power for a plurality of data streams transmitted on a plurality of transmission channels in a wireless multi-channel communication system, comprising:
   processing a plurality of received symbol streams in accordance with a particular receiver processing technique to provide a plurality of detected data streams;
   estimating signal-to-noise-and-interference ratios (SNRs) of the plurality of detected data streams;
   determining a difference between the SNR of each data stream and a setpoint associated with the data stream; and
   determining an adjusted transmit power for each detected data stream based on the determined difference between the SNR and the setpoint.

2. The method of claim 1, wherein each data stream is transmitted as one of a plurality of possible discrete data rates, and wherein each discrete data rate is associated with a respective setpoint.

3. The method of claim 2, wherein each setpoint corresponds to an SNR needed to achieve a particular performance level for the associated discrete data rate.

4. The method of claim 1, wherein the plurality of detected data streams achieve a specified spectral efficiency.

5. The method of claim 1, wherein the multi-channel communication system is a multiple-input multiple-output (MIMO) communication system.

6. A memory communicatively coupled to a digital signal processing device (DSPD) capable of interpreting digital information to:
   process a plurality of received symbol streams in accordance with a particular receiver processing technique to provide a plurality of detected data streams;
   estimate signal-to-noise-and-interference ratios (SNRs) of the plurality of detected data streams;
   identify each SNR that exceeds a setpoint; and
   determine an adjusted transmit power for each detected data stream associated with an SNR exceeding the setpoint.

7. An integrated circuit in a wireless communication system, comprising:
   means for processing a plurality of received symbol streams in accordance with a particular receiver processing technique to provide a plurality of detected data streams;
   means for estimating signal-to-noise-and-interference ratios (SNRs) of the plurality of detected data streams;
   means for identifying each SNR that exceeds a setpoint; and
   means for determining an adjusted transmit power for each detected data stream associated with an SNR exceeding the setpoint.

8. A receiver unit in a multi-channel communication system, comprising:
   a receive processor operative to process a plurality of received symbol streams in accordance with a particular receiver processing technique to provide a plurality of detected data streams, and to estimate signal-to-noise-and-interference ratios (SNRs) of the plurality of detected data streams; and
   a controller operative to identify each SNR that exceeds a setpoint, and to determine an adjusted transmit power for each detected data stream associated with an SNR exceeding the setpoint.

9. The receiver unit of claim 8, wherein the receive processor is operative to process the plurality of received symbol streams in accordance with a successive interference cancellation receiver processing technique.

10. The receiver unit of claim 8, wherein the controller is further operative to provide channel-state information (CSI) comprising identities of data streams with adjusted transmit powers.

11. The receiver unit of claim 10, further comprising:
   a transmit processor operative to process the CSI for transmission back to a transmitter unit.

12. A terminal comprising the receiver unit of claim 8.

13. A base station comprising the receiver unit of claim 8.

14. A receiver apparatus in a multi-channel communication system, comprising:
   means for processing a plurality of received symbol streams in accordance with a particular receiver processing technique to provide a plurality of detected data streams;
   means for estimating signal-to-noise-and-interference ratios (SNRs) of the plurality of detected data streams;
   means for identifying each SNR that exceeds a setpoint; and
   means for determining an adjusted transmit power for each detected data stream associated with an SNR exceeding the setpoint.

* * * * *